(12) United States Patent
Hoofard et al.

(10) Patent No.: US 10,494,205 B1
(45) Date of Patent: Dec. 3, 2019

(54) REMOTE LOADING DOCK AUTHORIZATION SYSTEMS AND METHODS

(71) Applicant: ASSA ABLOY Entrance Systems AB, Landskrona (SE)

(72) Inventors: Richard K. Hoofard, Dallas, TX (US); Daryl Day, Frisco, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 16/212,320

(22) Filed: Dec. 6, 2018

(51) Int. Cl.
| | |
|---|---|
| *B65G 69/28* | (2006.01) |
| *B65G 69/00* | (2006.01) |
| *G06Q 10/06* | (2012.01) |
| *H04L 9/32* | (2006.01) |
| *H04L 29/08* | (2006.01) |

(52) U.S. Cl.
CPC ....... *B65G 69/2882* (2013.01); *B65G 69/003* (2013.01); *G06Q 10/06316* (2013.01); *H04L 9/32* (2013.01); *H04L 67/12* (2013.01)

(58) Field of Classification Search
CPC .. B65G 69/28; B65G 69/2882; B65G 69/003; G06Q 10/06316; H04L 9/32; H04L 67/12
See application file for complete search history.

(56) References Cited

U.S. PATENT DOCUMENTS

| | | | |
|---|---|---|---|
| 4,009,051 | A | 2/1977 | Kazis et al. |
| 4,286,911 | A | 9/1981 | Benjamin |
| 4,476,853 | A | 10/1984 | Arbogast |
| 4,590,118 | A | 5/1986 | Yatabe et al. |
| 4,626,983 | A | 12/1986 | Harada et al. |
| 4,661,758 | A | 4/1987 | Whittaker |

(Continued)

FOREIGN PATENT DOCUMENTS

| | | |
|---|---|---|
| DE | 102004037933 B3 | 2/2006 |
| EP | 2215612 B1 | 8/2012 |

(Continued)

OTHER PUBLICATIONS

Dock Lighting Goes Green with the FT Ultra LED Docklight:, APS Resource, News Release. 1 page.

(Continued)

*Primary Examiner* — Thomas D Alunkal
(74) *Attorney, Agent, or Firm* — Perkins Coie LLP

(57) ABSTRACT

Systems and methods for monitoring components of a loading dock station that implement a remote monitoring and authorization system are disclosed. The systems and methods can provide information regarding the status of various components of the loading dock station to a remote monitoring and authorization control unit, where a supervisor or the like is capable of reviewing real time information regarding the status of the components and progress through and adherence to a workflow protocol. The systems and methods can also provide for authorization requests to be sent to the remote monitoring and authorization control unit, such as requests to override certain components of the docking station. The user at the remote monitoring and authorization control unit can then grant or deny requests based on status information and other data provided at the remote monitoring and authorization control unit.

22 Claims, 16 Drawing Sheets

(56) References Cited

U.S. PATENT DOCUMENTS

| | | |
|---|---|---|
| 4,744,121 A | 5/1988 | Swessel et al. |
| 4,843,373 A | 6/1989 | Trickle et al. |
| 4,988,254 A | 1/1991 | Alexander |
| 5,026,242 A | 6/1991 | Alexander |
| 5,047,748 A * | 9/1991 | Trickle .................. B65G 69/003 340/542 |
| 5,168,262 A | 12/1992 | Okayama |
| 5,168,267 A | 12/1992 | Trickle |
| 5,181,401 A | 1/1993 | Hodan et al. |
| 5,323,098 A | 6/1994 | Hamaguchi et al. |
| 5,576,533 A | 11/1996 | Tantraporn |
| 5,775,107 A | 7/1998 | Sparkman |
| 5,831,540 A | 11/1998 | Sullivan et al. |
| 5,886,863 A | 3/1999 | Nagasaki et al. |
| 5,886,883 A | 3/1999 | Rail |
| 5,898,585 A | 4/1999 | Sirichote et al. |
| 6,082,952 A | 7/2000 | Alexander |
| 6,367,259 B1 | 4/2002 | Timm |
| 6,369,462 B1 | 4/2002 | Siri |
| 6,390,245 B1 | 5/2002 | Metz et al. |
| 6,476,572 B2 | 11/2002 | Lounsbury |
| 6,543,375 B1 | 4/2003 | Sargent et al. |
| 6,663,527 B2 | 12/2003 | Phelan et al. |
| 6,781,516 B2 | 8/2004 | Reynard et al. |
| 6,787,259 B2 | 9/2004 | Colborn et al. |
| 6,810,817 B1 | 11/2004 | William |
| 6,812,849 B1 | 11/2004 | Ancel |
| 6,917,298 B2 | 7/2005 | Romano et al. |
| 6,972,226 B2 | 12/2005 | Deppe et al. |
| 6,975,226 B2 | 12/2005 | Reynard et al. |
| 7,032,720 B2 | 4/2006 | Jette et al. |
| 7,045,764 B2 | 5/2006 | Beggs et al. |
| 7,119,673 B2 | 10/2006 | Eager et al. |
| 7,162,762 B1 | 1/2007 | Gleason |
| 7,165,486 B2 | 1/2007 | Alexander et al. |
| 7,230,819 B2 | 6/2007 | Muchow et al. |
| 7,256,703 B2 | 8/2007 | Duvernell et al. |
| 7,264,092 B2 | 9/2007 | Jette |
| 7,274,300 B2 | 9/2007 | Duvernell et al. |
| 7,333,016 B2 | 2/2008 | Ancel |
| 7,380,375 B2 | 6/2008 | Maly |
| 7,730,981 B2 | 6/2010 | McCabe et al. |
| 7,750,890 B2 | 7/2010 | Fitzgibbon et al. |
| 7,864,030 B2 | 1/2011 | Jetté et al. |
| 8,112,949 B2 | 2/2012 | Eungard |
| 8,286,757 B2 | 10/2012 | Nelson et al. |
| 8,307,589 B2 | 11/2012 | Eungard et al. |
| 8,307,956 B2 | 11/2012 | Andersen et al. |
| 8,345,010 B2 | 1/2013 | Fitzgibbon et al. |
| 8,407,842 B2 | 4/2013 | Story et al. |
| 8,490,669 B2 | 7/2013 | Fletcher et al. |
| 8,497,761 B2 | 7/2013 | McNeill et al. |
| 8,510,888 B2 | 8/2013 | Eungard |
| 8,547,234 B2 | 10/2013 | Maly et al. |
| 8,590,087 B2 | 11/2013 | Swessel et al. |
| 8,590,674 B2 | 11/2013 | Jette et al. |
| 8,893,764 B2 | 11/2014 | Vohla et al. |
| 9,564,072 B2 * | 2/2017 | Senfleben .................. G09F 21/04 |
| 2002/0089427 A1 | 7/2002 | Aratani et al. |
| 2003/0167238 A1 | 9/2003 | Zeif et al. |
| 2005/0102042 A1 * | 5/2005 | Reynard .............. B65G 69/001 700/17 |
| 2005/0126081 A1 | 6/2005 | Patel et al. |
| 2006/0137261 A1 | 6/2006 | Maly |
| 2006/0181391 A1 | 8/2006 | McNeill et al. |
| 2007/0062422 A1 * | 3/2007 | Wotring .................... F23J 1/00 110/165 R |
| 2007/0157614 A1 | 7/2007 | Goldman |
| 2007/0283806 A1 | 12/2007 | Morrison |
| 2008/0011799 A1 | 1/2008 | Chang |
| 2008/0022596 A1 | 1/2008 | Boerger et al. |
| 2008/0127435 A1 | 6/2008 | Maly et al. |
| 2008/0143290 A1 | 6/2008 | Chavakula |
| 2010/0146719 A1 | 6/2010 | Swessel et al. |
| 2011/0075441 A1 | 3/2011 | Swessel et al. |
| 2011/0203059 A1 | 8/2011 | Whitley et al. |
| 2012/0025964 A1 | 2/2012 | Beggs et al. |
| 2012/0304558 A1 | 12/2012 | Iglesias et al. |
| 2013/0327914 A1 | 12/2013 | McNeill et al. |
| 2013/0332217 A1 | 12/2013 | McNeill et al. |
| 2014/0075842 A1 | 3/2014 | McNeill et al. |
| 2014/0247347 A1 | 9/2014 | McNeill et al. |
| 2015/0047132 A1 | 2/2015 | Sveum et al. |
| 2015/0047133 A1 | 2/2015 | Sveum |
| 2016/0090072 A1 * | 3/2016 | Metz ....................... B60T 17/22 188/1.11 E |
| 2017/0043967 A1 * | 2/2017 | Walford ............. B65G 69/2882 |
| 2017/0044817 A1 * | 2/2017 | McNeill ............... B65G 69/005 |
| 2017/0320685 A1 * | 11/2017 | Hoofard .................. E05F 15/40 |
| 2019/0002216 A1 | 1/2019 | Walford et al. |
| 2019/0144218 A1 * | 5/2019 | Hoofard ............... B65G 69/008 |

FOREIGN PATENT DOCUMENTS

| | | |
|---|---|---|
| EP | 2660170 A1 | 11/2013 |
| FR | 2869470 A1 | 10/2005 |
| WO | 2006066013 A2 | 6/2006 |
| WO | 2006076538 A2 | 7/2006 |
| WO | 2008014026 A1 | 1/2008 |
| WO | 2009070509 A1 | 6/2009 |
| WO | 2010077977 A1 | 7/2010 |
| WO | 2011037839 A1 | 3/2011 |
| WO | 2015023666 A1 | 2/2015 |
| WO | 2015023669 A1 | 2/2015 |
| WO | 2015166339 A1 | 4/2015 |
| WO | 2016007321 A1 | 1/2016 |
| WO | 2019173811 | 9/2019 |

OTHER PUBLICATIONS

Pentalift introduces industry's first solar powered dock leveler! www.pentalift.com, Jun. 14, 2011, 1 page.
APS&GO—LED Communication System Specification Sheet, APS Resource, For APS1102, Nov. 2009, 2 pages.
Energy Saving Products Brochure, APS Resource, Mar. 2009, 4 pages.
FT Ultra LED Flex Arm Docklight Specification Sheet, APS Resource, Form APS 1168, Nov. 2009, 2 pages.
High Impact LED Dock Light Specification Sheet, APS Resource, Form APS1171, Nov. 2009, 2 pages.
Keley Company; Vehicle Restraints brochure; 2008 ; 8 pages.
Kelley Company; product brochure; 2008; 8 pages.
Manual and Automatic Light Communication Systems, User's Manual, Serco, Oct. 2009, 28 pages.
Model G307K2 Kadet 2 Operator Interface with 7" TFT Display, Red Lion Controls, Inc., Nov. 23, 2015, 4 pages.
Rite-Hite Corporation, Rite-Vu Light Communication Systems Brochure, 6 pages [Not dated].
Safety & Lighting Products Brochure, APS Resource, Sep. 2004, 2 pages.
Serco Vehicle Restraints brochure; 2008; 4 pages.
Serco; Loading Dock Solutions brochure; 2008; 8 pages.
Smart Power Systems International GmbH, Web pages for Hybrid DC/AC Power Supply, Jun. 1, 2004.

* cited by examiner

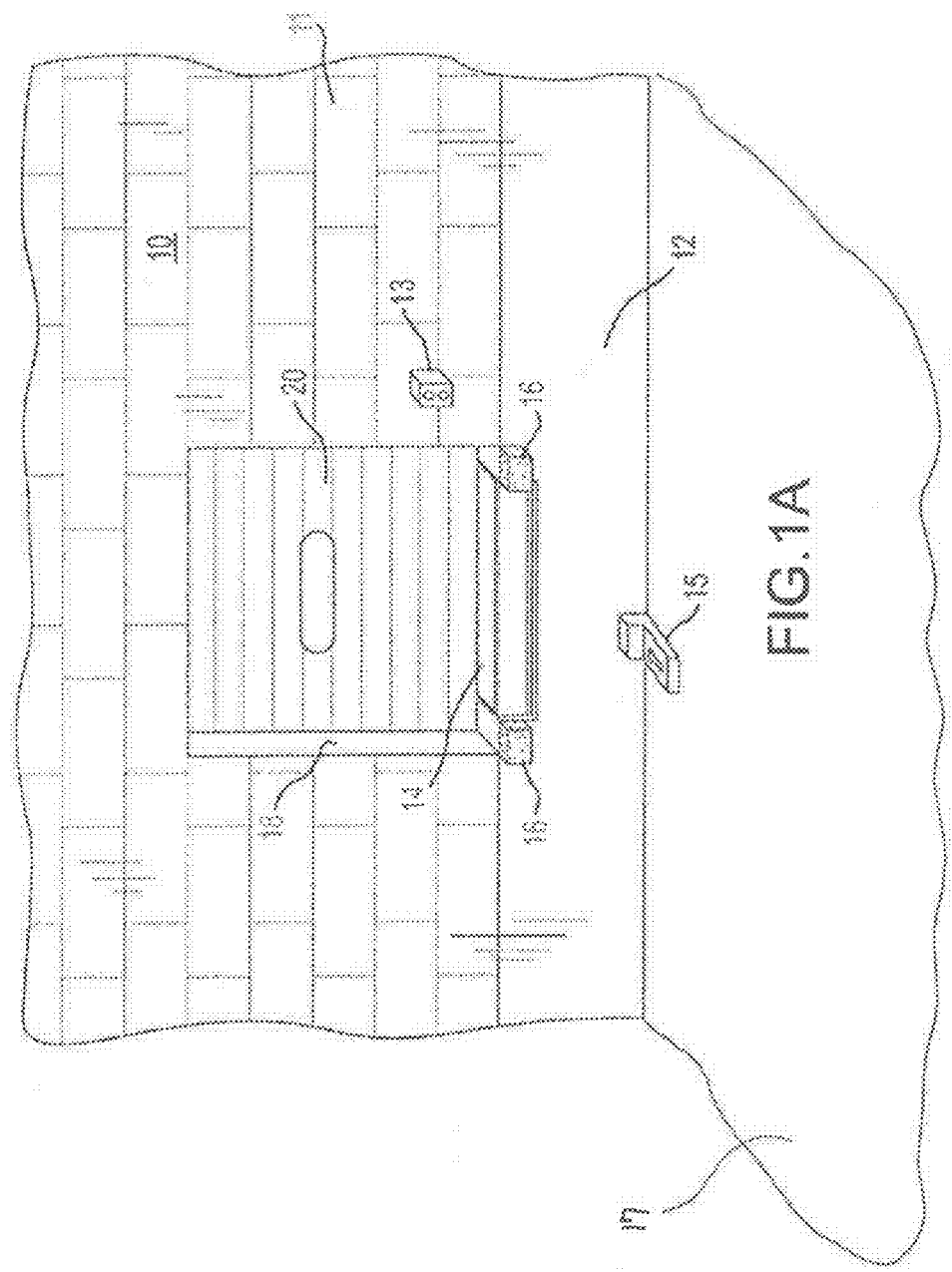

REMOTE LOADING DOCK AUTHORIZATION SYSTEMS AND METHODS

TECHNICAL FIELD

The following disclosure relates generally to systems and methods for remotely monitoring operations at one or more vehicle docking stations and implementing a remote authorization system to authorize performance of certain operations at the vehicle docking station. Embodiments of the systems and methods described herein can be configured to utilize wireless communications networks, including arranging the components of the system in an Internet of Things (IoT) network.

BACKGROUND

Vehicle docking facilities, such as warehouses, typically include multiple vehicle docking stations that facilitate the movement of goods between the facility and a vehicle parked at the docking station. Each vehicle docking station can include docking equipment used to improve the safety and efficiency of moving goods between the facility and the vehicle. A vehicle docking station can include, for example, a vehicle restraint used to ensure that the vehicle does not move away from the docking station during loading and unloading, a dock door used to control access into and out of the warehouse, a dock leveler used to provide a bridge or ramp between the vehicle and the facility, a barrier gate to prevent cargo or personnel from falling out of the docking station when the dock door is open, and an inflatable shelter to provide cover between the vehicle and the facility during loading and unloading.

Some vehicle docking facilities use a workflow protocol to help improve safety and efficiency at the vehicle docking stations. For example, such workflow protocols may call for dock personnel to not open a dock door until proper vehicle restraint engagement has been confirmed, or for a dock leveler to not be extended until a dock door has been opened. Such workflow protocols may be guidelines that dock personnel are expected to follow manually, or may be automated, such that a computer system monitoring all of the docking equipment at a particular vehicle docking station prohibits operation of a certain piece of docking equipment until the computer system receives confirmation that another piece of docking equipment has been successfully operated (e.g., the system prevents opening of the dock door until the system receives confirmation that the vehicle restraint has successfully engaged the vehicle parked at the docking station). Descriptions of loading dock workflow protocols and docking equipment are provided in commonly owned U.S. patent application Ser. No. 16/109,603, U.S. Patent Application Publication No. 2017/0320685 and U.S. Pat. No. 10,081,504, the entirety of which are hereby incorporated by reference.

Safety and efficiency issues can arise when dock personnel do not follow workflow protocol guidelines, or when dock personnel override the computer systems put in place to ensure adherence to workflow protocols. While a supervisor's responsibilities will generally include monitoring dock personnel to ensure compliance with a workflow protocol, it is often difficult for a supervisor to monitor all of the vehicle docking stations under his or her supervision at once. Additionally, efficiency within the facility may be improved if the supervisor is able to spend less time monitoring dock personnel and more time attending to other tasks.

BRIEF DESCRIPTION OF THE DRAWINGS

FIG. 1A is an isometric view of the exterior of a docking station at which one or more components of a dock equipment control system configured in accordance with embodiments of the present technology can be implemented.

DETAILED DESCRIPTION

Figure 1B:
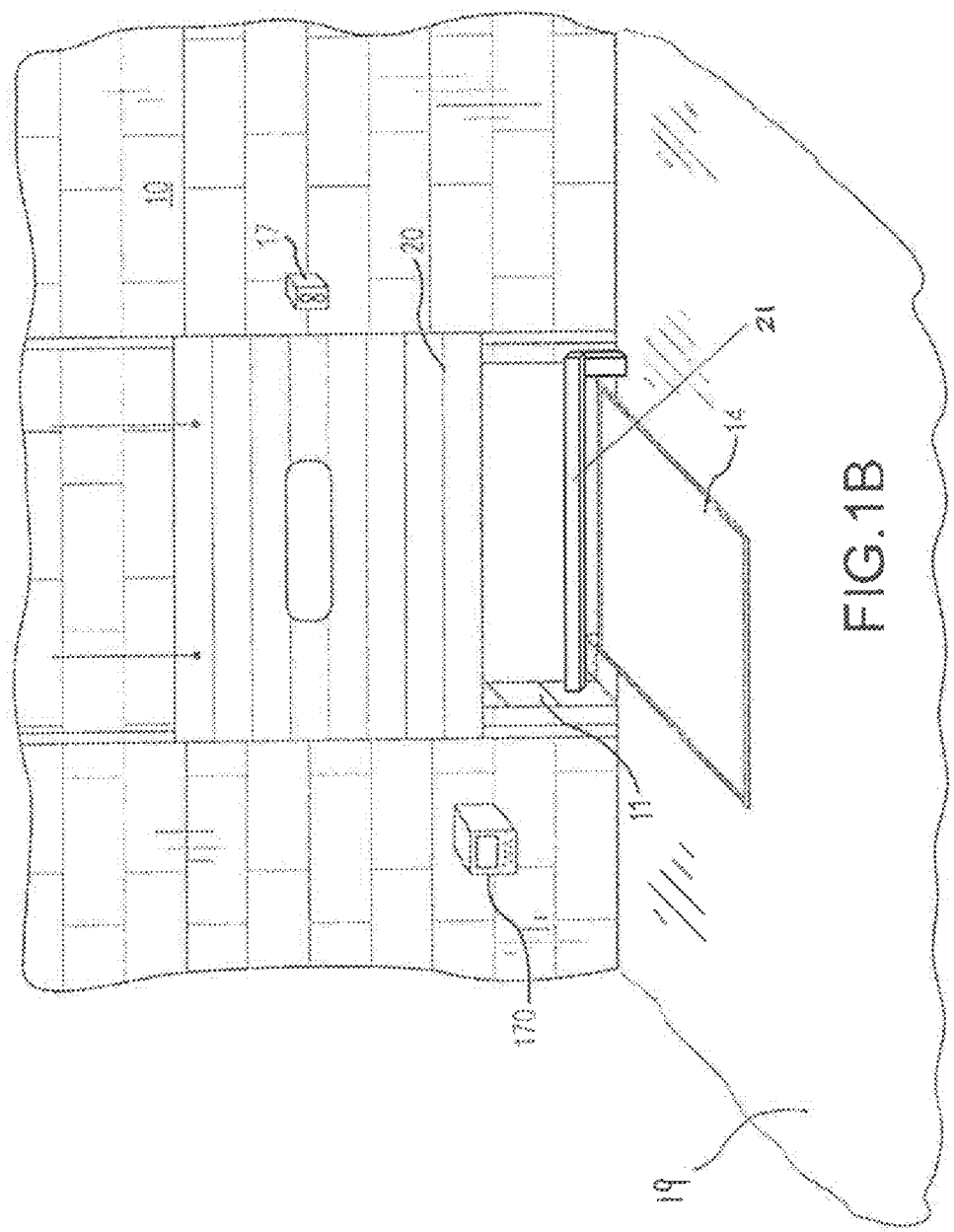
FIG. 1B is an isometric view of the interior of the docking station of FIG. 1A, configured in accordance with embodiments of the present technology.

Described herein are embodiments of a remote loading dock authorization system. The remote loading dock authorization system generally monitors the components of an automated loading dock station to ensure that a workflow protocol for the operation of the components is adhered to. If an attempt is made to deviate from the workflow protocol, or if dock personnel wants to affirmatively seek permission to deviate from the workflow protocol, the system can transmit an authorization request to a supervisor or the like and prevent the attempted deviation from the workflow protocol until the supervisor provides the requested authorization. Information pertaining to the status and operation of the loading dock station can be provided to the supervisor to use as part of deciding whether to provide the requested authorization. Communication among all components of the system, including authorization requests and associated data, can be facilitated via the use of a wireless communication network, including a IoT network, meaning that the supervisor can be located essentially anywhere in the world and still provide a level of oversight that can help to reduce accidents and improve operational efficiency.

Certain details are set forth in the following description and FIGS. 1A-13 to provide a thorough understanding of various embodiments of this disclosure. Those of ordinary skill in the relevant art will appreciate, however, that the technology disclosed herein can have additional embodiments that may be practiced without several of the details described below and/or with additional features not described below. In addition, some well-known structures and systems often associated with loading dock equipment, loading dock equipment control systems, apparatuses, and methods have not been shown or described in detail below to avoid unnecessarily obscuring the description of the various embodiments of this disclosure.

In the Figures, identical reference numbers identify identical, or at least generally similar, elements. Many of the details, dimensions, angles, and other features shown in the Figures are merely illustrative of particular embodiments of the disclosure. Accordingly, other embodiments can have other details, dimensions, angles, and features without departing from the spirit or scope of the present invention. In addition, those of ordinary skill in the art will appreciate that further embodiments of the invention can be practiced without several of the details described below.

FIG. 1A is an isometric view of the exterior of a docking station 10. The docking station 10 typically includes a dock door 20 installed in an opening 18 in a building wall 11 at an elevated position above a yard or drive 17. A dock face 12 extends from the drive 17 to the bottom of the building wall 11. The dock door 20 can be set back from the dock face 12 a distance of, e.g., from 6 to 8 inches. A dock leveler 14 is positioned in the opening 18 and can serve as a ramp which, when engaged, provides access between the dock floor and the floor of a trailer positioned at the docking station 10. While not shown in FIG. 1A, the dock station can also include a dock seal, which typically extends around the top and left and right sides of the opening 18 and provides a seal between the building wall 11 and the trailer.

The docking station 10 can also include outside communication lights 13 mounted on the exterior side of the building wall 11 and preferably at a location that allows easy viewing by a driver while parking a trailer at the docking station 10. In some embodiments, the outside communication lights 13 are positioned to the right of the dock door 20 as shown in FIG. 1A so that the outside communication lights 13 can be seen in the side view mirrors of the trailer being positioned at the docking station 10. The outside communication lights 13 can be used to communicate various messages to the driver (or other workers outside of the warehouse), such as whether the trailer can be moved away from the docking station 10.

The docking station 10 can further include a trailer restraint 15. The trailer restraint 15 can be mounted to the dock face 12 near the ground and centered with respect to the dock door 20. The trailer restraint 15 is operable to raise and engage with a bar (e.g., a rear impact guard (RIG)) provided at the rear of a trailer to prevent the trailer from moving away from the dock face 12 during loading and unloading operations. Further description of trailer restraints suitable for use in the systems and methods described herein are provided in commonly owned U.S. patent application Ser. No. 15/466,006, the entirety of which is hereby incorporated by reference.

The docking station 10 can further include a set of dock bumpers 16. The dock bumpers 16 are mounted near the top of the dock face 12 and just outboard of either side of the dock leveler 14. When a trailer backs into the docking station 10, the dock bumpers 16 serve as a physical signal that the trailer can stop backing up and also prevent the trailer from contacting the building wall 11.

FIG. 1B shows an isometric view of the interior of the docking station 10. As described above, the dock door 20 is movably attached to tracks on the interior side of the building wall 11, and the dock leveler 14 can be rotatably mounted in a pit in the building floor 19. FIG. 1B also illustrates a dock gate 21 that can be provided for creating a barrier behind the dock door 20 when the dock door 20 is open. The dock gate 21 is provided as safety measure for preventing falls when the dock door 20 is open. The dock gate may be part of the automated system, thereby allowing it to be automatically extended and retracted based on the workflow protocol.

As described in greater detail below, the interior side of the building wall 11 can be used for mounting various components of a dock equipment monitoring and control system configured in accordance with embodiments of the present technology. For example, in some embodiments, a docking station control unit 170 of a dock equipment monitoring and control system can be mounted on the interior side of the building wall 11, such as to the left or right of the dock door 20. Inside communication lights 17 can also be mounted on the interior side of the building wall 11. The inside communication lights 17 can be used to communicate various messages to the workers inside the warehouse, such as whether loading and unloading of a trailer can begin.

The various components of the docking station 10 described above can be controlled by a dock equipment monitoring and control system. In some embodiments, the dock equipment monitoring and control system can generally include two primary control units responsible for monitoring and controlling the operation of the various components of the docking station. In some embodiments, the two primary control units include a docking station control unit typically located at or near the docking station 10 and generally designed to provide dock personnel working at the docking station 10 with at least some level of control over the components of the docking station, and a remote monitoring and authorization control unit typically located remote from the docking station 10 and generally designed to allow a supervisor to monitor the operation of several docking stations at once and to provide a level of control over each individual docking station to help ensure compliance with workflow protocols. In some embodiments, the docking station control unit communicates directly with the components of the docking station and relays information about the components to the remote monitoring and authorization control unit, and the remote monitoring and authorization control unit communicates instructions directly to the docking station control unit, which then relays any necessary command actions on to the individual components of the docking station. However, it should be appreciated that in alternative embodiments, the remote monitoring and authorization control unit can be configured to directly communicate with one or more individual components of the docking station (i.e., bypass the docking station control unit), either in addition to being able to communicate directly with the docking station control unit or in lieu of being able to communicate directly with the docking station control unit.

Figure 1C:
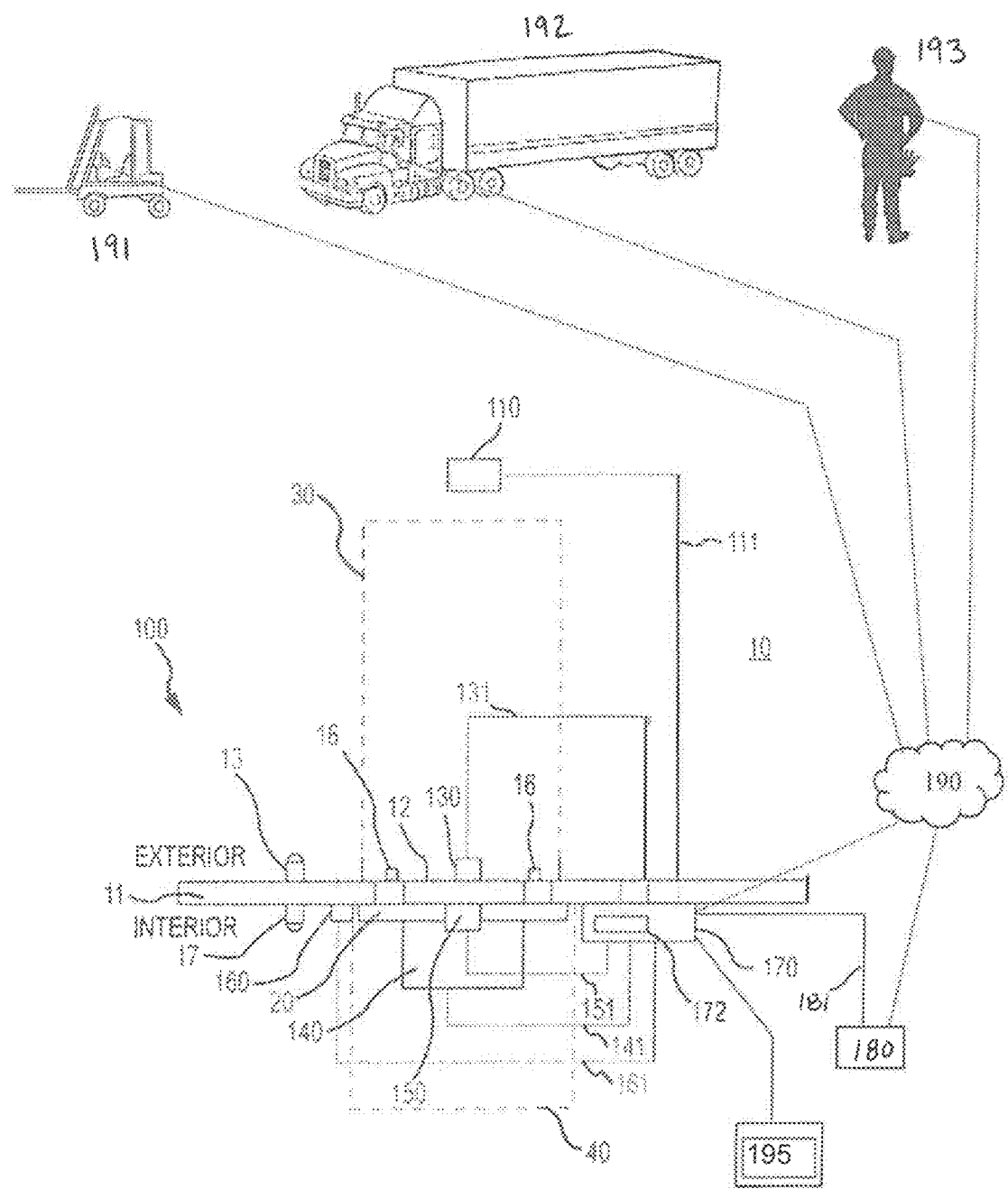
FIG. 1C is a top view schematic diagram illustrating a dock equipment control system configured in accordance with embodiments of the present technology.

An embodiment of the above described configuration for the dock equipment monitoring and control system 100 is schematically illustrated in FIG. 1C. More specifically, FIG. 1C is a schematic diagram illustrating a top view of the docking station 10 equipped with a dock equipment monitoring and control system 100 (including the docking station control unit 170 and a remote monitoring and authorization control unit 180) configured in accordance with an embodiment of this disclosure. The system 100 further includes a vehicle detection sensor system 110, a trailer restraint system 130 (configured to control trailer restraint 15), a dock leveler system 140 (configured to control dock leveler 14), an interior clearance sensor system 150, and a dock door opening system 160 (configured to control dock door 20). As discussed in greater detail above, the docking station 10 generally includes the dock door 20, an external trailer docking area 30, and an internal trailer loading area 40. The various hardware included in the system 100 can be generally similar in structure and function to hardware included in many loading dock stations, such as the loading docks described in commonly owned U.S. Pat. Nos. 8,510,888; 8,490,669; 8,407,842; 8,307,589; 8,297,333; 8,181,401; 8,112,949; 8,037,576; and 7,657,957, each of which is hereby incorporated herein by reference in its entirety.

The system 100 illustrated in FIG. 1C is configured for communication amongst some or all components of the system 100. As discussed in greater detail below, a network 190 can be provided so that signals can be transmitted back and forth amongst the components of the system 100 in manner consistent with the methods described here. For example, the network 190 facilitates both the automation of the components of the system in accordance with a workflow protocol and the implementation of authorization system in which any deviation from the workflow protocol requires preauthorization. In some embodiments, the network 190 is an IoT network, and the components of the system 100 are each provided with the necessary hardware, software, electronics, sensors, etc. for communicating with the other components of the system via the IoT network.

As shown in FIG. 1C, the docking station control unit 170 can be electrically connected to each of the vehicle detection sensor system 110 (via link or line 111), the trailer restraint system 130 (via link or line 131), the dock leveler system 140 (via link or line 141), the interior clearance sensor system 150 (via link or line 151), the inside communication lights 17 (via a link or line not shown in FIG. 1C), the outside communication lights 13 (via a link or line not shown in FIG. 1C), the dock door opening system 160 (via link or line 161), and a remote monitoring and authorization control unit 180 (via link 181) so that the docking station control unit 170 can receive and send signals to and from each of the components of the dock station and the remote monitoring and authorization control unit 180. The lines 111, 131, 141, 151, 161 and 181 can generally include wired connections, e.g., electrical lines, connecting the individual components of the system, but the lines 111, 131, 141, 151, 161, 181 can also represent wireless communication signals sent back and forth between the components of the system 100. The lines (not shown) connecting the inside communication lights 17 to the docking station control unit 170 and the outside communication lights 13 to the docking station control unit 170 can also generally include electrical lines or wireless signals.

While shown proximate the docking station 10 in FIG. 1C, the remote monitoring and authorization control unit 180 is generally located remote from the docking station 10, such as in a centralized area of the multi-docking station facility in which the docking station 10 is located. In some embodiments, the remote monitoring and authorization control unit 180 may not even be at the same facility as the docking stations it monitors. For example, the remote monitoring and authorization control unit 180 may be located in a different building, at a different site, in a different city, in a different state, or even in a different country. Communication between the remote monitoring and authorization control unit 180 and the other components of the system when the control unit 180 is located in, e.g., a different building, state, city, etc., can be facilitated via a wireless network, an IoT network, the cloud, and/or other suitable networking system.

The network 190 is provided for facilitating communication between some or all of the components of the system 100, including the docking station control unit 170 and the remote monitoring and authorization control unit 180. The network 190 can be any suitable network used for facilitating communication between components connected to the network 190. Communication networks include, but are not limited to, local area networks (LAN), wireless area networks (WAN), and the Internet. In some embodiments, the network 190 is configured as an Internet of Things (IOT) network permitting communication between some or all components of the system 100 via the Internet. In an IOT environment, the components of the system 100 may all be connected to the Internet so that each component of the system 100 is capable of communicating with other components of the system 100. Cloud computing may also be used to network the components of the system 100. While FIG. 1C shows the loading dock control unit 170 and the remote monitoring and authorization control unit 180 being connected to the network 190, such that communication amongst the components of the system 100 is routed through loading dock control unit 170 and remote monitoring and authorization control unit 180, the network 190 may also be configured so that all components of the system are directly connected with the network 190, thereby permitting direct communication between any components of the system 100.

The network 190 can also facilitate communication between some or all components of the system 100 and users of the system, such as those shown in FIG. 1C. For example, FIG. 1C shows a forklift operator 191, a trailer operator 192 and a dock personnel 193, each of which can receive communication from the system 100 via the network 190 and send messages/signals back to the system 100 via the network 190. Other types of users not shown in FIG. 1C can also be communicated with via the network 190. In the example of the forklift operator 191, messages, such as authorization request messages and messages regarding status of components of the system, can be sent to the forklift operator using the network 190. The forklift operator 191 may receive the messages via any suitable device, such as a laptop computer, a tablet, or a smart phone. The device used by the forklift operator 191 to communicate with the system 100 via the network 190 can be mounted to the forklift or can be a mobile device that the forklift operator can keep with him or her, even when no longer using the forklift. Similar devices can be used by the trailer operator 192 and the dock personnel 193 in order to communicate with the system 100 via the network 190. As noted previously, the network 190 may be an IoT network, in which case the device used by the forklift operator 191, the trailer operator 192, the dock personnel 193, etc. to communicate with the system 100 via the network may be an Internet-configured device.

Figure 3:
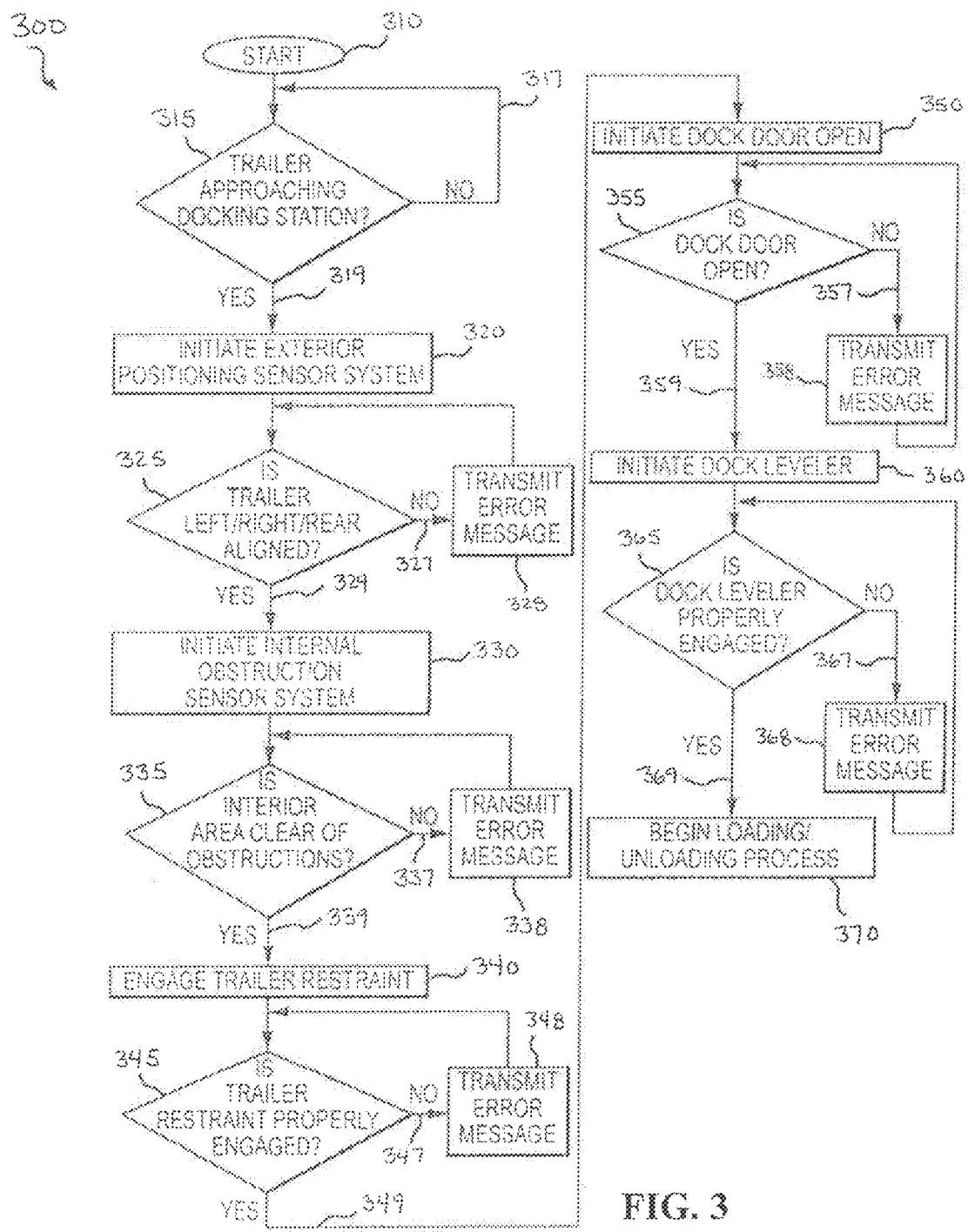
FIG. 3 is a flow chart illustrating a routine for operating a dock equipment control system configured in accordance with embodiments of the present technology.

In operation of the system 100 shown in FIG. 1C, the docking station control unit 170 is generally responsible for monitoring the status of the components of the docking station and implementing a workflow protocol that helps to ensure the components are operated in a certain order that promotes safety and efficiently within the facility. An exemplary workflow protocol that can be implemented by the docking station control unit 170 is illustrated in FIG. 3 and described in greater detail below. The docking station control unit 170 is configured to communicate with the remote monitoring and authorization control unit 180 to provide the remote monitoring and authorization control unit 180 with status information pertaining to the components of the docking station. The docking station 170 is also configured to provide authorization requests to the remote monitoring and authorization control unit 180, and receive and implement responses to authorization requests from the remote monitoring and authorization control unit 180. The present disclosure first describes how the docking station control unit 170 monitors and manages the components of the docking station 10 before turning to a description of how the docking station control unit 170 communicates and interacts with the remote monitoring and authorization control unit 180.

Figure 1D:
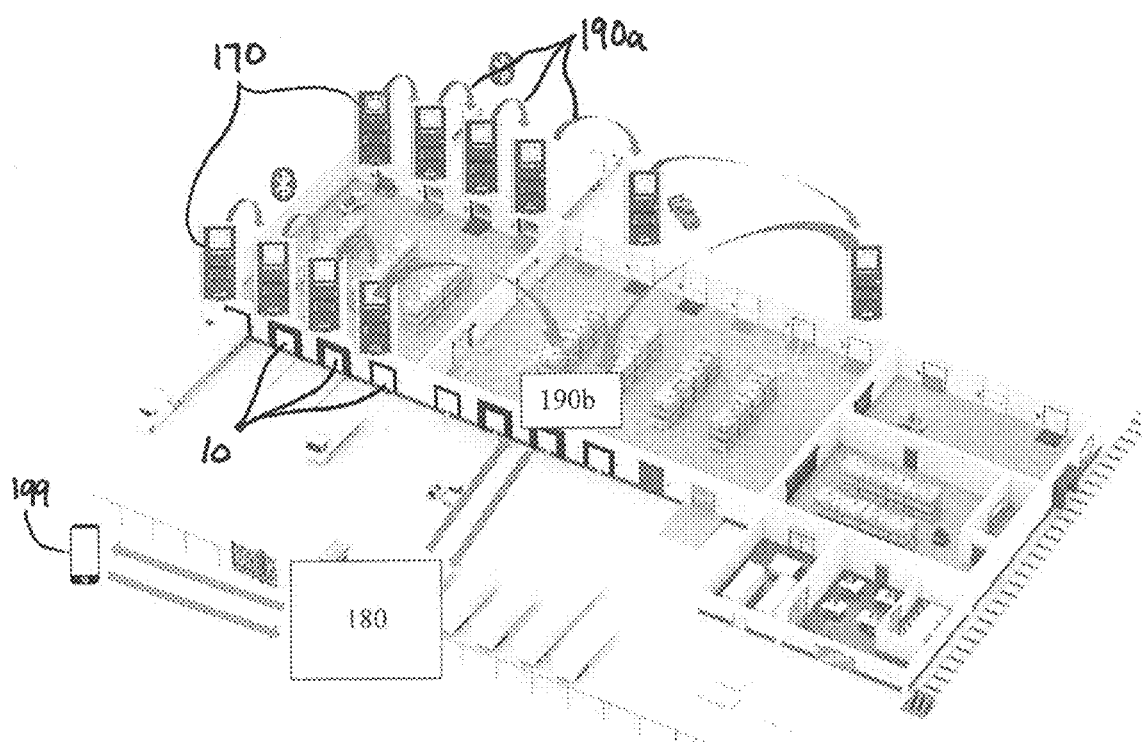
FIG. 1D is a schematic diagram illustrating a multi-docking station network configured in accordance with embodiments of the present technology.

FIG. 1D illustrates an embodiment of a warehouse that includes a plurality of docking stations 10, each of which is equipped with system 100 (not shown in FIG. 1D), that are networked together to facilitate management of the warehouse. Docking station control units 170 are provided at each docking station 10, and are each connected to a network so that information can be relayed back and forth between the individual docking station control units 170 and a remote monitoring and authorization control unit 180. The network is also configured such that the docking station control units 170 and the remote monitoring and authorization control unit 180 can communicate with one or more devices 199 (e.g., laptop, mobile phone, tablet, etc.). This allows information regarding management of each docking station 10 to be communicated to, e.g., a forklift operator 191, a trailer operator 192, or a dock personnel 193 (as shown in FIG. 1C).

Any manner of networking together the docking station control units 170, the remote monitoring and authorization control unit 180 and one or more devices 199 can be used, including various networking methods used in concert. As illustrated in FIG. 1D, a Bluetooth mesh network 190a is used to network together each individual docking station control unit 170. The Bluetooth mesh network 190a (which can also be any other type of mesh network) provides a dynamic and non-hierarchical infrastructure where each node in the network is directly connected to as many other nodes in the network as possible. The mesh network 190a thereby provides for efficient routing of information within the network 190a. The network 190 can also include a cellular gateway 190b to provide reliable and flexible Internet access to all devices in the network 190. In FIG. 1D, the cellular gateway facilitates communication between the mesh network 190a of docking station control units 170 and the remote monitoring and authorization control unit 180. Use of a cellular gateway 190b as a component of the network 190 can beneficially eliminate the need for the components of the overall system to access a LAN or WAN set up at the warehouse but used for other purposes. Finally, communication between the remote monitoring and authorization control unit 180 and the one or more devices 199 can be facilitated by, for example, the Internet, the cloud, or a cellular network.

Docking Station Control Unit Communication with Components of Docking Station

Each of the vehicle detection system 110, the trailer restraint system 130, the dock leveler system 140, the interior clearance system 150 and the dock door opening system 160 monitor the status of their associated component. For example, the trailer restraint system 130 monitors whether trailer restraint 15 is engaged or disengaged with a vehicle, including whether an engagement has been attempted but is not successful. As such, signals received by the docking station control unit 170 from any of the vehicle detection system 110, the trailer restraint system 130, the dock leveler system 140, the interior clearance system 150 and/or the dock door opening system 160 may generally convey one or more pieces of information to the docking station control unit 170 regarding the status of these individual components. When the systems 110, 130, 140, 150 and 160 are Internet enabled, such communication with the control unit 170 can be via an IoT network 190. The docking station control unit 170 processes the information and, based on the input signal received, may send out an instruction signal to any of the individual components of the dock equipment control system 100. Such instruction signals may instruct any of the individual components to, for example, engage or disengage, open or close, etc.

In some embodiments, the docking station control unit 170 receives signals from one or more of the components of the system 100 and provides visual signals via the inside communication lights 17 and/or the outside communication lights 13. As shown in FIGS. 1B and 1C, the outside communication lights 13 can be mounted on an exterior side of the building wall 11 and the inside communication lights 17 can be mounted on an interior side of the building wall 11. In such configurations, the outside communication lights 13 can convey visual messages or signals to the driver of a trailer being parked at the docking station (or other worker located outside of the warehouse) and the inside communication lights 17 are generally used to convey visual signals to workers inside of the warehouse. In some embodiments, the inside communication lights 17 and the outside communication lights 13 each contain at least a green light and a red light. The inside communication lights 17 and the outside communication lights 13 can optionally further include a third light, such as an amber light. The individual lights on the outside communication lights 13 and the inside communication lights 117 can be used alone or together to convey various messages or signals based on the status of one or more components of the system 100.

In one example, the docking station control unit 170 illuminates the red light on the outside communication lights 13 when the docking station control unit 170 receives signals indicating that the trailer restraint is properly engaged. The illuminated red light indicates to the driver that he or she should not attempt to move the trailer away from the docking station 10. In conjunction with illuminating the red light on the outside communication lights 13, the docking station control unit 170 can also use the information regarding the trailer restraint to illuminate the green light on the inside communication lights 17. The green light serves as a signal to workers inside the warehouse that it is safe to raise the dock door and begin loading or unloading the trailer. When the trailer restraint 15 is not properly engaged, the controller 170 can instruct the inside communication lights 17 to illuminate a red light to indicate that it is not safe to load or unload the trailer. Similarly, the docking station control unit 170 can use this information to illuminate flashing red and green lights on the outside communication lights 13 to indicate to the driver the trailer restraint is not properly engaged.

The above example is just one of numerous different ways in which the docking station control unit 170 can control the inside communication lights 17 and the outside communication lights 13 to communicate visual signals to workers inside and outside of the warehouse. As noted, the docking station control unit 170 can communicate with both the inside communication lights 17 and the outside communication lights 13 at the same time and using the same information. This enables the inside communication lights 17 and outside communication lights 13 to work in concert to convey a set of related messages to inside and outside workers regarding the conditions inside and/or outside of the warehouse.

The docking station control unit 170 can include any number and type of control unit components capable of working together to receive and deliver signals to various components associated with the docking station 10 in accordance with a set of computer readable instructions that, when executed, provide an automatic dock equipment control and communication system. In some embodiments, for example, the docking station control unit 170 includes a programmable logic controller (PLC). The docking station control unit 170 can also include software, including software carried on a computer readable media, which provides instructions for carrying out and maintaining the automatic docking procedure disclosed herein. The docking station control unit 170 can also include, or be operably connected to, a server for assisting in the transmission of the various signals being sent back and forth between the components of the system 100. The signal may be carried to the docking station control unit 170 via wiring or through wireless means.

In some embodiments, the docking station control unit 170 includes a graphical user interface (GUI) display 172. The GUI 172 can provide various information, such as textual and/or graphical information, regarding the system 100 for an individual to consult and/or respond to when monitoring and managing the system 100. In one embodiment, the status of all of the components of the system 100 can be displayed by one or more display pages on the GUI 172. The status displayed can be simplified, such as indicating either an "OK" or an "ERROR" status identifier. An "OK" status identifier can indicate that the individual component is operating in accordance with the system protocol and therefore subsequent process steps can take place, while an "ERROR" status identifier can indicate that an individual component is not operating in accordance with the system protocol and therefore no other process steps can take place until the component is checked and the issue remedied. In other embodiments, the GUI 172 provides more detailed information regarding the status of each individual component. For example, regarding the interior clearance sensor system 150, the GUI 172 can display specific information indicating how many obstructions have been detected and where each obstruction is located. The system 170 can also provide information audibly via speakers or visually via one or more lights.

The GUI 172 can also include means for automatically and/or manually sending messages regarding the status of various components of the system 100 to one or more different individuals and/or to the remote monitoring and authorization control unit 180 (described in greater detail below). These communication capabilities can include the ability to send a message (e.g., voice mail, text message, email, etc.) to a driver positioning a trailer at a docking station. The message can provide real time information on how to re-position the trailer to ensure correct alignment. Similar information and/or messages can be sent to other individuals involved in the loading process regarding other components of the system, such as a yard manager, an operator, or other individuals working within the warehouse. In some embodiments, such information and/or messages are conveyed to the remote monitoring and authorization control unit 180.

In the case of the GUI 172 sending messages to the remote monitoring and authorization control unit 180, the messages sent may pertain to, for example, the status of components of the docking loading station 10 (e.g., the restraint 15, the dock leveler 14, the dock door 20, etc.), problems occurring with respect to the components of the dock loading station 10, and requests for authorization to override components of the dock loading station 10, including but not limited to, requests for authorization to deviate from a workflow protocol (e.g., engaging a component despite unsuccessful completion of another component's operation).

In one embodiment, the GUI 172 can also provide means for manually operating any of the components of the system 100, including individual functions of the components of the system 100. The means can include, for example, buttons, knobs, levers, dials, switches, etc., including both physical and touch screen versions. In some embodiments, the GUI 172 indicates an error message indicating a problem with a component of the system. The error message can then be communicated (either by an individual monitoring the GUI 172 or by the GUI 712 itself) to an individual tasked with correcting the error. Once the individual believes the issue is corrected, the GUI 172 can be used to, for example, rerun a scan of an interior area to ensure a detected obstruction has been cleared, or to reinitiate a trailer engagement sequence after a trailer has been repositioned.

The GUI 172 can be provided at a variety of different locations and/or in a variety of different forms. In some embodiments, the GUI 172 is located in a centralized location of the warehouse where other monitoring functions are carried out. The GUI can also be positioned near the dock door, including on a wall next to the dock door. The GUI can also be in the form of a hand-held device, such as a PDA or tablet that can be carried throughout the warehouse by, for example, a warehouse manager. The system described herein can also include any number of GUIs, including, for example, a GUI positioned at each dock door of the warehouse and/or a centralized location.

Turning now to individual components of the system 100, the vehicle detection sensor system 110 is generally any type of sensor suitable for use in detecting the presence or absence of a particular object from a field of view. Suitable vehicle detection sensors can include, but are not limited to, infrared sensors, laser sensors, microwave sensors, inductive loop sensors, photo sensors, pressure sensors, ultrasonic sensors, sonar sensors, thermal sensors, optical sensors, magnetic sensors, or camera analytics sensors. In some embodiments, the vehicle detection sensor system 110 is configured for sensing the presence or absence of a vehicle approaching the docking station 10. In some embodiments, the vehicle detection sensor system 110 is positioned at a location external to the warehouse but proximate an individual docking station 10. For example, as shown in FIG. 1C, the vehicle detection sensor system 110 can be positioned at a distal end of the trailer docking area 30 so that the vehicle detection sensor system 110 senses the trailer as it first moves into the trailer docking area 30. The vehicle detection sensor system 110 can be positioned on the ground or at an elevated position. In some embodiments, the vehicle detection sensor system 110 can be positioned much closer to the dock face than what is shown in FIG. 1C, for example, within 2 feet of the trailer's final position.

The vehicle detection sensor system 110 is configured to send a signal to the control unit 170 via line 111 when the vehicle detection sensor system 110 detects a trailer entering the trailer docking area 30. The docking station control unit 170 receives this signal and, in some embodiments, responds by sending out a command or control signal to one or more of the other components of the dock equipment control system 100, such as signals that cause other components of the dock equipment control system 100 (e.g., the vehicle restraint 15, the dock leveler 14, the dock door 20, etc.) to engage or disengage. The vehicle detection sensor system 110 can also be designed to continuously transmit a signal to the docking station control unit 170 indicating that no trailer is detected and to stop transmitting the signal when a trailer is detected. In such configurations, the docking station control unit 170 processes the absence of a signal from the vehicle detection sensor system 110 as the event that triggers one or more signals being sent by the docking station control unit 170 to other components of the dock equipment control system 100. In some embodiments, the docking station control unit 170 responds to an indication from the vehicle detection sensor system 110 that a trailer is approaching the docking station 10 by automatically sending a signal to the exterior positioning system 120, which in turn instructs the exterior positioning system 120 to wake from a dormant state and begin scanning for the trailer approaching the docking station.

The interior clearance sensor system 150 is configured to scan or monitor a field of view including an interior area 40 (FIG. 1C) behind the dock door 20 for obstructions that might impede loading or unloading of the trailer at the docking station 10. Clearing the interior area 40 can be especially critical when loading and unloading of the trailer is assisted by the use of laser guided vehicles (LGVs), fork lifts, etc. These vehicles, which typically use lasers to follow paths marked on a warehouse floor, can be disrupted from performing loading and unloading of a trailer if the paths are interrupted or blocked by obstructions. The interior clearance sensor system 150 can generally include one or more sensors capable of identifying an object located within a predetermined area. Any suitable sensors capable of identifying objects in this manner can be used, including but not limited to, infrared sensors, laser sensors, microwave sensors, inductive loop sensors, photo sensors, pressure sensors, ultrasonic sensors, sonar sensors, thermal sensors, optical sensors, magnetic sensors, or camera analytics sensors. As shown in FIG. 1C, the interior clearance sensor system 150 can include a sensor positioned centrally over the top of the dock door 20. This sensor is designed to view or scan an area in front of the dock door and provide a signal to the control unit 170 if an obstruction is identified.

The size and shape of the area 40 scanned by the interior clearance sensor system 150 can be varied based on the specific application and/or the preferences of the user. In some embodiments, the area scanned has a square or rectangular shape, though other shapes such as semi-circles or triangles could be used. The size of the area scanned can vary across a wide range, with some scanned areas being 40 ft$^2$ or larger. The interior clearance sensor system 150 can also be designed to identify obstructions having varying sizes. In some embodiments, the interior clearance sensor system 150 is capable of identifying any obstructions having a size as small as, e.g., 1 in$^2$.

The interior clearance sensor system 150 is typically activated upon receiving a signal from the docking station control unit 170, which may be sent upon receiving, for example, a signal from the vehicle detection system sensor 110 indicating that a vehicle has been detected at the docking station. Activation of the interior clearance sensor system 150 can cause the interior clearance sensor system 150 to begin a scan of the predetermined area 40 in front of the dock door 20. Depending on the specific system used, the scan of the entire area can be carried out simultaneously, or can take the form of a scan that moves from, for example, left to right across the predetermined area. Upon completion of the scan, the interior clearance sensor system 150 can provide a signal to the control unit 170 which provides information on the results of the scan. In a simplified system, the signal is binary, and indicates only whether an obstruction was identified or not, but does not provide information on how many obstructions were identified or where the obstruction is located within the scanned area. In more sophisticated systems, the signal can provide information on the number of obstructions and/or the location of the obstruction or obstructions.

When the interior clearance sensor system 150 provides a signal to the control unit 170 indicating that an obstruction has been identified, the docking station control unit 170 can transmit one or more different types of messages to one or more recipients (including, for example, sending a message to the remote monitoring and authorization control unit 180). In one embodiment, a message indicating an obstruction has been identified is conveyed to a warehouse manager or the like. The message can be conveyed by, for example, a voice message, text message or email to a cell phone or other mobile device, or as a message sent to and displayed on the remote monitoring and authorization control unit 180. When the docking station control unit 170 sends an obstruction message, the control unit docking station 170 is also generally configured to prevent initiation of any other components of the system 100 (e.g., raising the dock gate and/or the dock door opening system 160) until the obstruction has been cleared.

After an obstruction has been identified by the interior clearance sensor system 150, subsequent scanning of the interior area to confirm the obstruction has been removed can be carried out automatically or upon manual initiation. In an automatic configuration, the interior clearance sensor 150 may be programmed to rescan the designated area after a certain time has passed (e.g., 30 seconds) from the obstruction initially being identified. This periodic rescan can be run repeatedly until the obstruction is cleared, after which a signal is sent to the docking station control unit 170 indicating the area is clear and allowing the docking station control unit 170 to restart the process. In another embodiment, the initial scan is run only once, and does not run again until a user manually instructs the scan to be carried out again (such as after this user has cleared the area via the user interface of the control unit 170). The manually initiated rescan will then check the area and, assuming the obstruction has been cleared, send a signal to the docking station control unit 170 indicating that the obstruction has been cleared.

Figure 2A:
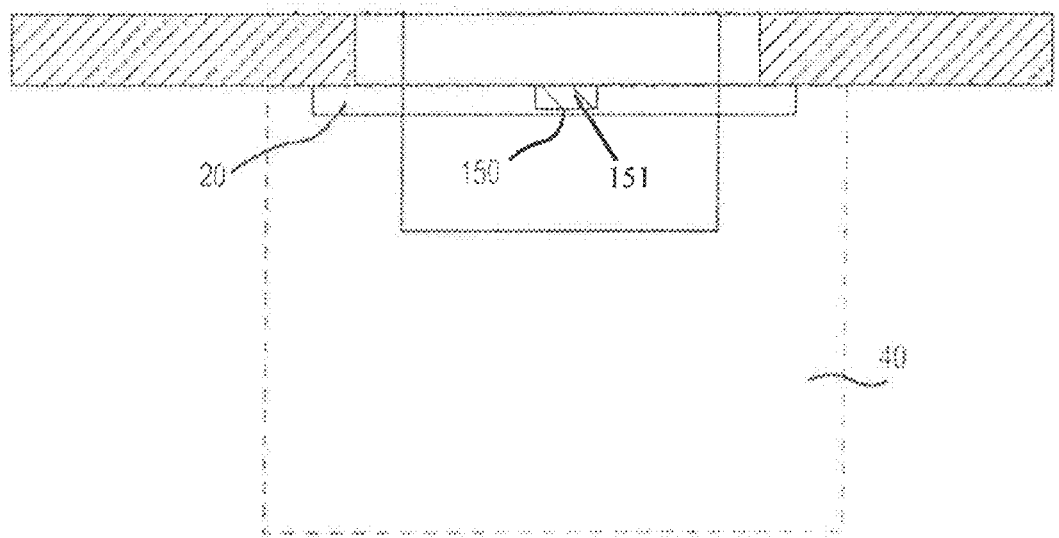
FIGS. 2A and 2B are top and side view schematic diagrams, respectively, illustrating an exterior positioning system and an interior clearance system installed at a docking station configured in accordance with an embodiment of the present disclosure.
Figure 2B:
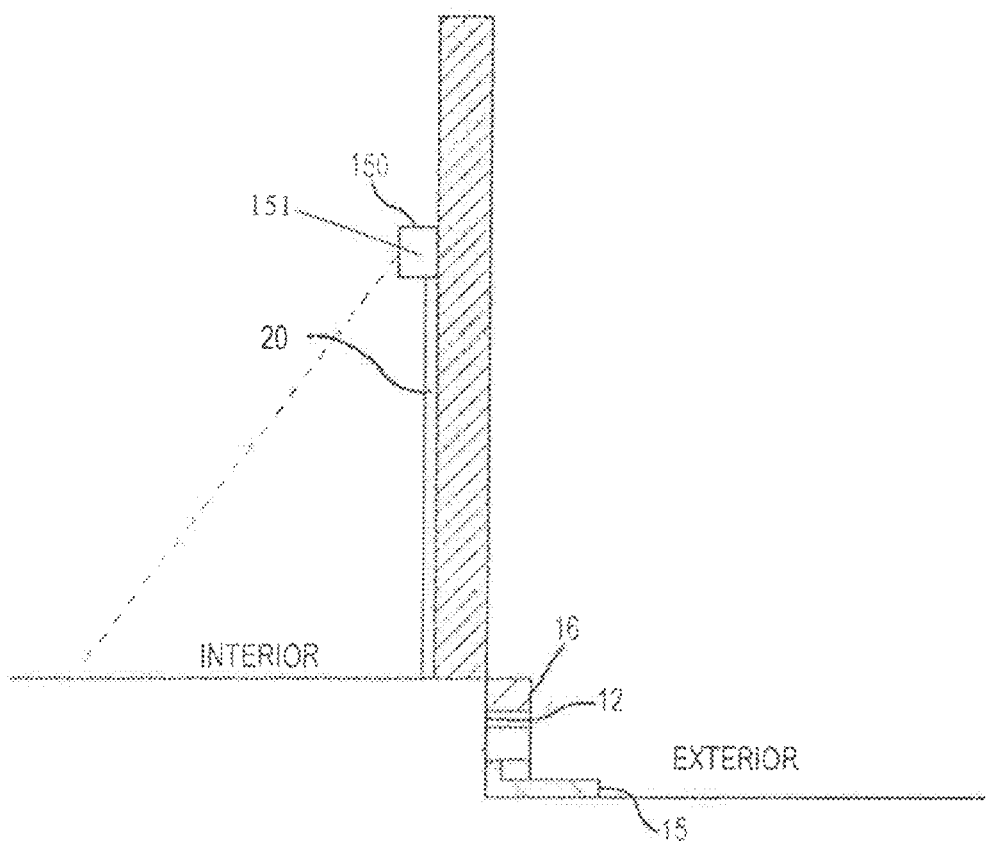

FIGS. 2A and 2B illustrate schematic diagrams of the interior clearance sensor system 150 positioned on an interior side of the dock door 20, and the corresponding scan region produced by the sensor system. FIG. 2A illustrates a top view and FIG. 2B illustrates a side view of the sensor system. As these views show, the interior clearance sensor system 150 includes a single sensor 151 positioned centrally over the top of the dock door 20. The interior clearance sensor system 150 scans a roughly rectangular shaped area 40 behind the dock door 20 on the interior of the docking station. FIG. 2B shows how the sensor of the interior clearance sensor system 150 is located above the dock door 20.

Referring back to FIG. 1C, when the interior clearance sensor system 150 transmits a signal to the docking station control unit 170 indicating that the interior area 40 behind the dock door 20 is clear of obstructions, the docking station control unit 170 can transmit a signal to the trailer restraint system 130 instructing the trailer restraint system 130 to engage the trailer. The trailer restraint system 130 can generally include any type of trailer restraint known to those of ordinary skill in the art. The trailer restraint system 130 generally includes a hook or other structure that engages with the trailer (e.g., the Rear Impact Guard (RIG)) to stabilize the trailer and prevent the trailer from moving away from the dock bumpers 16 during loading and unloading of the trailer. The trailer restraint generally takes the form of a hook or barrier type apparatus that is coupled to the dock face 12 or parking surface proximate the dock door 20. When the trailer restraint is initiated, the barrier extends out of the restraint housing (e.g., upward or laterally), and blocks either the vehicle wheels or a bar provided under the rear bumper of the trailer (e.g., a RIG) from moving away from the dock face 12.

The trailer restraint system 130 is configured to provide a signal to the docking station control unit 170 when the trailer restraint is properly engaged with the trailer. The trailer restraint can include, e.g., a sensor that is capable of determining if the trailer restraint is properly engaged. When the trailer restraint system 130 is unable to provide a signal back to the docking station control unit 170 indicating that the trailer restraint is properly engaged (or sends a signal back to the docking station control unit 170 indicating that trailer restraint is not properly engaged), the docking station control unit 170 can convey one or more different types of messages to one or more recipients (including sending a message to the remote monitoring and authorization control unit 180). In one embodiment, a message indicating the trailer restraint has not properly engaged is conveyed to a dock manager or the like, such as via the remote monitoring and authorization control unit 180. The message can also be a text message or voice message to the driver or other dock personnel instructing them to manually place wheel chocks under the rear wheel(s) and contact the dock manager when complete. The message can be conveyed by, for example, a voice message, text message or email to a cell phone or other mobile device, or to a screen of a display (e.g., the display of the remote monitoring and authorization control unit 180). When the docking station control unit 170 sends this error message, the docking station control unit 170 is also generally designed to prevent initiation of any other components of the system 100 (e.g., dock door opening system 160) until the trailer restraint has been properly engaged. Similar to the interior clearance sensor system 150 described above, the trailer restraint system 130 can be configured to run repeated checks for proper engagement of the trailer restraint at a predetermined time interval after the initial error message, or only check for proper engagement after an individual manually instructs the check to be performed again (typically after the individual has attended to the trailer restraint and manually corrected the issue).

As discussed above, the trailer restraint system 130 is provided at least in part to prevent the trailer from moving away from the dock bumpers 16 during the loading and unloading process. Even with a trailer restraint system 130, some movement of the trailer away from the dock bumpers 16 can take place. Accordingly, the system 100 described herein can include additional components which serve to monitor movement of a trailer away from the dock bumpers 16 and provide an alert when such movement occurs (including whether a trailer restraint is used or not). For example, movement of a trailer away from dock bumpers 16 can be monitored by a component of the system 100 described herein, or can be a stand-alone system which does not require the presence of the other components of the system 100 described herein.

In one embodiment, monitoring the movement of a trailer away from the dock bumpers 16 can be carried out using a sensor system. In such a sensor system, one or more sensors are used to create a scan zone located directly in front of the dock bumpers 16. The scan zone can have a relatively narrow depth (distance away from the dock bumpers) such that trailer is only detected in the scan zone when the trailer is located directly against the dock bumpers or a small allowable distance away from the dock bumpers. When the trailer is inside of this zone, the trailer is considered to be in the desired loading position. If the trailer begins to move away from the dock door, the trailer will move out of the scan zone. At this point, the sensor system provides a message to the control unit 170 to provide an alert that the trailer has moved away from the dock bumpers. The control unit may then relay this message to the appropriate person, such as through the use of a messaging system as described above or through a GUI as described above, at which point steps can be taken (such as an audible or visual alarm to notify people on the trailer or nearby) so that the condition may be remedied. When a sensor system monitoring the movement of a trailer away from the dock bumpers is used in conjunction with the system 100 described herein, the sensor system can cooperate with one or more of the trailer restraint system 130, and the control unit 170 to carry out the function.

When the system 100 described above is used in conjunction with the trailer restraint system 130, the scan system can beneficially help to monitor the development of various issues, such as the development of hook pinch. Hook pinch can occur when a trailer restraint is engaged with a trailer and the trailer moves away from the dock bumpers such that the RIG or vehicle tire(s) begins to contact and pull against the trailer restraint. In some cases, the pressure applied by the trailer on the trailer restraint is sufficiently great that the trailer restraint cannot disengage without the trailer first being moved back toward the dock bumpers. The scan system described above can be an improvement over previously known trailer restraints that monitor hook pinch, because the scan system does not require a specialized trailer restraint with pressure sensors to assess and remedy hook pinch. The scan system described herein can be retrofitted on virtually any existing docking station and does not require the purchase and installation of a new trailer restraint having a pressure sensor. Logic can be programmed into the dock equipment control system 100 such that when the system 100 attempts to disengage the trailer restraint and fails, a text or voice message can be sent to the driver or a message sent to the dock or yard manager to back up the vehicle (back to the dock bumpers) and the trailer restraint disengage operation can be repeated until successful. Additionally, the scan system described avoids the need for a more complicated and expensive trailer restraint that includes a sensor, which may be more prone to maintenance issues and malfunction.

Other sensor systems for detecting the movement of a trailer away from a dock bumper can also be used. In one embodiment, wheel chocks used to prevent movement of a trailer once positioned at a docking station can be used to monitor movement. The wheel chocks can include, for example, pressure sensors which detect increases in pressure that correlate to movement of a trailer away from the dock bumpers. The wheel chocks may be electrically connected via a link or line to a control unit in order to send a message when such increases in pressure are detected. Similarly, pressure pads located near the dock door can be used to detect movement of the trailer away from the dock bumpers. Using standard wheel locations on a trailer, the pressure pads may be positioned at locations just in front of where wheels of a trailer will be positioned when the trailer is correctly positioned at a docking station. If the trailer begins to move away from the dock door, the wheels will begin to roll over the pressure pads. When the pressure pads detect this pressure, a message can be communicated from the pressure pads to a control unit, which responds by relaying a message or alert to a user regarding the movement of the trailer away from the dock bumpers.

Referring to the trailer restraint system 130 used in conjunction with the system 100 described herein, when the trailer restraint system 130 properly engages the RIG, wheels, etc., the trailer restraint system 130 sends a signal to the docking station control unit 170 indicating proper trailer engagement has been achieved. Upon receipt of this signal, the docking station control unit 170 can provide a signal to the dock door opening system 160 (FIG. 1C) that causes the opening system 160 to open the dock door, and/or provide a signal to the operator with instructions to raise the door manually or use the docking station control unit 170 to enter a "open door" instruction. The dock door opening system 160 can include any type of automatic door opening mechanism known to those of ordinary skill in the art.

The dock door opening system 160 can be configured to send signals back to the docking station control unit 170 indicating whether the dock door has been successfully opened. As with previously described components of the system 100, the dock door opening system 160 can provide a signal indicating that the dock door has not properly opened or that the dock door has been properly opened. When a signal is transmitted indicating the dock door has not been properly opened, the docking station control unit 170 can convey error messages as described above. The dock door opening system 160 can also continue to check for correction of the error until the door has been properly opened, or can recheck for correction of the issue only after manually instructed to do so. Having received the error message from the dock door opening system 160, the docking station control unit 170 can prevent the initiation of any other components of the system until the error is resolved.

Once the door opening system 160 confirms the door 20 is opened properly, the door opening system 160 conveys a signal to the docking station control unit 170 informing the docking station control unit 170 that the dock door 20 is open. At this point, the docking station control unit 170 can transmit a signal to the dock leveler system 140 that instructs or otherwise causes the dock leveler system 140 to initiate. The dock leveler system 140 can include any type of suitable dock leveler known to those of ordinary skill in the art. The dock leveler generally includes an adjustable ramp that provides a smooth transition from the interior area in front of the dock door to the interior floor of the trailer bed, such as in situations where the interior floor in front of the dock door is higher or lower than the interior floor of the trailer bed. In other embodiments, the docking station control unit 170 can display a message to a dock operator indicating that the operation can open the door by manually controlling the docking station control unit 170.

As with the other components of the system 100 described herein, the dock leveler system 140 is capable of transmitting a signal to the docking station control unit 170 indicating whether or not the dock leveler has been properly positioned. The dock leveler system 140 generally used any type of sensor (e.g., laser, pressure, magnetic, etc.) to confirm that the dock leveler has been properly positioned. When the dock leveler is not properly positioned, the signal sent to the docking station control unit 170 can result in the docking station control unit 170 sending an error message as described in detail above. The dock leveler system 140 can repeatedly check for correction of the issue or be instructed to manually recheck the dock leveler position. While the dock leveler system 140 communicates to the docking station control unit 170 that the dock leveler is not properly positioned, the docking station control unit 170 can prevent engagement or other operation of any subsequent components in the system 100.

Once proper positioning of the dock leveler in the trailer has been confirmed, the dock leveler system 140 can convey this message to the docking station control unit 170 for appropriate processing. In some embodiments, proper positioning of the dock leveler is the end of the docking station preparation process and the docking station control unit 170 therefore does not communicate any new signals directing further operation of the components in the system 100. In one embodiment, the docking station control unit 170 is in communication with a separate automated system 195 designed to run and operate the loading and/or unloading of the trailer, such as a warehouse management system or an automatic loading system, for example, an Automatic Guided Vehicle (AGV) system. In such embodiments, the docking station control unit 170 can transmit a signal to the automated loading/unloading system 195 which indicates that the dock station is ready for loading or unloading. The docking station control unit 170 can also send a signal that directly initiates the automated loading/unloading system 195, or send a message to an individual, such as a warehouse manager, which informs the individual that the dock station is prepared for loading/unloading. The individual can then take further steps to initiate operation of the automated loading/unloading systems 195, such as through manual initiation.

The system 100 has generally been described above in connection with a specific dock station preparation process. However, those of ordinary skill in the art will understand that the system 100 may also function using a different sequence of steps without departing from the technology disclosed herein. For example, in the system 100 described above, the interior clearance sensor system 150 carries out an interior scan prior to the trailer restraint system 130 being engaged. The system 100 can easily be modified such that the trailer restraint system 130 is engaged prior to or at the same time as the interior clearance sensor system 150 being engaged. Other reordering and/or omitting of steps can also be carried out, and the instant disclosure contemplates these alternate embodiments.

In the embodiments described above, various steps of the process may include the communication of a message to, for example, an individual or a GUI display screen of a user device (e.g., a user-computer, hand-held device such as a smart phone, etc.), indicating a status of a component of the system 100. This can include sending messages to the remote monitoring and authorization control unit 180 (which can be in the form of a laptop, tablet, or other handheld device). The message can convey information regarding the operational state of the individual components of the system 100, including whether an error has occurred (e.g., an obstruction exists in the interior area, a trailer restraint has not properly engaged, etc.). In some embodiments, one or more components of the system can include means for manually or remotely overriding the individual component so that when an error message is conveyed, the component can be manually operated by an individual to attempt to correct the issue. As discussed in greater detail below, such a manual override may first require that an authorization request be sent to the remote monitoring and authorization control unit 180 and that an authorization message be communicated back to the docking station control unit 170. The means for manually or remotely overriding the component can include, but is not limited to, a user controlled key or a passcode, a barcode reader, a card scanner, or a finger print identification system or user/password authentication. Thus, in some embodiments, the remote monitoring and authorization control unit 180 can include a user interface that allows for the entering of a passcode. The remote monitoring and authorization control unit 180 can also include peripheral devices connected thereto, such as a card scanner, a card reader, a barcode reader, and a finger print scanner. This embodiment of the system allows for only certain designated individuals to attend to the correction of various components of the system 100 and also allows for tracking of which individuals are attending to the correction of the identified issue.

Communicating messages to an individual, GUI display screen, etc. as mentioned above may be carried out using any suitable communication network. For example, a wireless network may be used to communicate messages. Other suitable networks include the cloud or an Internet of Things network.

FIG. 3 is a flow diagram of a technique or routine 300 for carrying out an automated docking procedure according to embodiments of the present disclosure. The automated docking procedure shown is only for exemplary purposes and other procedures are contemplated and fall within the scope of the invention disclosed herein. The procedure illustrated is generally configured such that successful completion of a step must be completed before a second, or subsequent, step in the process can be carried out.

The routine 300 can be carried out by a processor of the docking station control unit 170 according to computer-executable instructions. Those skilled in the relevant art will appreciate that the routine 300 can be practiced with other computer system configurations, including Internet appliances, hand-held devices, wearable computers, cellular or mobile phones, multi-processor systems, microprocessor-based or programmable consumer electronics, set-top boxes, network PCs, mini-computers, local servers, cloud-based servers and the like. The routine 300 can be embodied in a special purpose computer or data processor that is specifically programmed, configured or constructed to perform one or more of the computer-executable instructions explained in detail herein. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The routine 300 can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the routine described herein may be stored or distributed on computer-readable media, including magnetic and optically readable and removable computer discs, stored as in chips (e.g., EEPROM or flash memory chips). Alternatively, aspects of the routine may be distributed electronically over the Internet or over other networks (including wireless networks). Those skilled in the relevant art will recognize that portions of the routine may reside on a server computer, while corresponding portions reside on a client computer. Data structures and transmission of data particular to aspects of the routine are also encompassed within the scope of the invention.

The routine starts 310 when a trailer approaches the docking station. A vehicle detection sensor system detects when a trailer approaches the docking station 315. If the vehicle detection sensor system does not detect a trailer 317, then no subsequent steps are carried out and the process returns to the start 310. If the vehicle detection sensor system does detect a trailer 319, then a command is sent from, e.g., the control unit 170, to an exterior positioning system 320 to begin the process of assisting the trailer with the backup procedure.

As the trailer backs up towards the dock bumpers, the exterior positioning system 320 determines whether the trailer is achieving left, right, and/or rear alignment 325. If the exterior positioning system detects that the trailer is not aligned on the left, right, and/or at the rear 327, the exterior positioning system sends a message 328 to the control unit 170 that provides an indication of misalignment, and, in some cases, provides which steps should be taken to remedy the misalignment. This message 328 can then be sent from the control unit 170 to the driver or other individual who can assist with aligning the trailer. After the message 328 is sent, the step of checking for left, right, and/or rear alignment 325 is repeated. When the trailer achieves proper left, right, and rear alignment 329, then a command is sent from the control unit 170 to the interior sensor system 330 to begin the process of checking the interior area behind the dock door for any obstructions.

Once initiated, the interior scan is carried out to check for obstructions in the area behind the dock door 335. If obstructions are found 337, then the interior clearance sensor system coordinates with the control unit to send a message 338 to the control unit 170 that the area is not clear and, in some cases, also provides information on how many obstructions were identified and/or where the obstructions are located. After the message 338 is sent to the control unit 170, the step of scanning the interior area 335 is repeated. When the scan of the interior area 335 indicates that the interior area is clear of obstructions 339, then a command is sent from the control unit 170 to the trailer restraint system 340 to engage the trailer restraint with the trailer.

After the instruction to engage the trailer restraint 340 is carried out, the trailer restraint system provides feedback to the control unit 170 as to whether proper engagement was accomplished 345. If the trailer restraint is not properly engaged 347, the trailer restraint system sends a message 348 to the control unit 170 that indicates the trailer restraint system did not properly engage. As described above in connection with the description of FIG. 1C, the message can be sent in a variety of formats to one or more recipients, including a forklift operator 191, a trailer operator 192, or a dock personnel 193 (including a dock supervisor). The message can be relayed from the control unit 170 to a user 191, 192, 193 via the network 190 (e.g., an IoT network) and can be received by the user 191, 192, 193 through the use of, e.g., an Internet enabled laptop, tablet, smart phone, other handheld device, etc.

After the message 348 is sent, the step of checking for proper trailer restraint engagement 345 is repeated. When confirmation is obtained that the trailer restraint is properly engaged 349, then a command is sent to initiate a dock door opening procedure 350.

After instruction to open the dock door 350 is carried out, the dock door system provides feedback as to whether the dock door was successfully opened 355. If the dock door does not successfully open 357, the dock door system and the control unit coordinate to send a message 358 that indicates the dock door did not successfully open. As described above, the message can be sent in a variety of formats to one or more recipients, including a screen of a smart phone or a screen of a computer. After the message 358 is sent, the step of checking for whether the dock door opened successfully 355 is repeated. When confirmation is obtained that the dock door is open 359, then a command is sent from the control unit 170 to engage the dock leveler 360.

After the instruction to engage the dock leveler 360 is carried out, the dock leveler system provides feedback to the control unit 170 as to whether the dock leveler was successfully engaged with the trailer bed 365. If the dock leveler does not properly engage 367, the dock leveler system sends a message 368 to the control unit 170 that indicates the dock leveler is not properly positioned in a trailer. As described above, the message can be sent in a variety of formats to one or more recipients, including a screen of a smart phone or a screen of a computer. After the message 368 is sent, the step of checking for whether the dock leveler properly positioned 365 is repeated. When confirmation is obtained that the dock leveler is properly positioned 369, then a command is sent to initiate the trailer loading and/or unloading process 370. The initiation of a loading and/or unloading process 370 may include communicating with another system that manages loading and unloading processes or may communicate a message to an individual who then takes steps to begin the loading and/or unloading process.

Embodiments of the process described herein can be carried out in reverse in order to prepare the dock station for a loaded or unloaded trailer to pull away from the dock station. Such a process can begin when a signal is provided to the system 100 indicating that the loading or unloading of the trailer has been completed and the trailer is ready to pull away from the dock station. This message can be manually provided to the system, such as an individual providing the instruction through the GUI described above, and/or the message can be conveyed from a separate system, such as a yard management system or a loading system. Receipt of this message causes the docking station control unit to 170 convey a message to the dock leveler system 140 to disengage the dock leveler. Once the dock leveler is properly disengaged, a close dock door instruction can be sent to the dock door system 160, followed by a message to the trailer restraint system 130 to disengage the trailer restraint. The interior clearance sensor system 150 and the exterior positioning system 120 may also be a part of the reverse procedure or may be optionally left out of the reverse system.

As with the process for aligning an approaching trailer at the dock station and readying the dock station for loading or unloading described in detail above, the reverse procedure uses the docking station control system 170 to receive and send various signals regarding the status of the various components of the system. Additionally, the order of the steps in the reverse procedure need not be carried out in any one specific order and can be varied based on the specific needs of the user.

Docking Station Control Unit Communication with Remote Monitoring and Authorization Control Unit The above section provides a detailed discussion of a workflow protocol and the use of the docking station control unit 170 to help ensure compliance with the workflow protocol. More specifically, the systems and methods described above call for the docking station control unit 170 to prevent operation of one or more components of the docking station until a previous component in the workflow protocol has carried out its operation successfully. With the addition of the remote monitoring and authorization control unit 180, the workflow protocol can further be supplemented with the ability to require and obtain authorization before any deviations from the workflow protocol are allowed to occur. Requiring authorization from, for example, an experienced supervisor, can help to reduce instances of dangerous deviations from the workflow protocol and expedite dock operations.

The system 100 is configured to enable communication back and forth between the docking station control unit 170 and the remote monitoring and authorization unit 180. This communication can include the docking station control unit 170 providing docking component status information to the remote monitoring and authorization control unit 180; the docking station control unit 170 sending, e.g., override authorization requests to the remote monitoring and authorization control unit 180; the remote monitoring and authorization control unit 180 sending accept or decline signals to the docking station control unit 170 in response to authorization requests; and/or the remote monitoring and authorization control unit 180 sending command instructions to the docking station control unit 170. As shown in FIG. 1C, such communication can be via a network 190. When the network 190 is, for example, a wireless network or an IoT network, communication between docking station and control unit 170 and remote monitoring and authorization unit 180 can be over any distance, permitting the remote monitoring and authorization control unit 180 to be truly remote from the system 100 and fully mobile.

The remote monitoring and authorization control unit 180 can be configured similarly or identically to the docking station control unit 170 in terms of its hardware, software, networking capabilities, display, etc. For example, like the docking station control unit 170, the remote monitoring and authorization control unit 180 can include any number and type of control unit components capable of working together to receive and deliver signals to various components associated with the remote monitoring and authorization control unit 180 configured in accordance with a set of computer readable instructions which, when executed, provide a monitoring and authorization system. In some embodiments, the remote monitoring and authorization control unit 180 includes a programmable logic controller (PLC). The remote monitoring and authorization control unit 180 can also include software, including software carried on a computer readable medium, which provides instructions for carrying out and maintaining the procedures described herein, including the authorization procedures described in greater detail below. The remote monitoring and authorization control unit 180 can also include a server for assisting in the transmission of the various signals being sent back and forth between the components of the system 100. The signal may be carried to the remote monitoring and authorization control unit 180 via control wiring or through wireless means. In some embodiments, the remote monitoring and authorization control unit 180 is a personal computer, a smart phone, a tablet, a dedicated mobile device, etc.

In some embodiments, the remote monitoring and authorization control unit 180 includes a graphical user interface (GUI) display (e.g., LED display, LCD display, etc.). The GUI can provide various information, such as textual and/or graphical information, regarding the system 100 for an individual to consult and/or respond to when monitoring and managing the system 100, such information can typically be transmitted to the remote monitoring and authorization control unit 180 from the docking station control unit 170. In one embodiment, the status of all of the components of the system 100 can be displayed by one or more display pages on the GUI of the remote monitoring and authorization control unit. The status displayed can be simplified, such as indicating either an "OK" or an "ERROR" status identifier. An "OK" status identifier can indicate that the individual component is operating in accordance with the system protocol and therefore subsequent process steps can take place, while an "ERROR" status identifier can indicate that an individual component is not operating in accordance with the system protocol and therefore no other process steps can take place until the component is checked and the issue remedied, or authorization is requested and granted for overriding the improperly functioning component. In other embodiments, the GUI provides more detailed information regarding the status of each individual component. For example, regarding the interior clearance sensor system 150, the GUI can display specific information indicating how many obstructions have been detected and where each obstruction is located.

In one embodiment, the GUI can also provide means for manual initiation and operation of any of the components of the system 100, including individual functions of the components of the system 100. The means can include, for example, buttons, knobs, levers, dials, switches, etc., including both physical and touch screen versions. The ability for a supervisor to manually operate a component of the system via a GUI of the remote monitoring and authorization control unit 180 allows for scenarios in which an authorization request is sent to the remote monitoring and authorization control unit 180 for bypassing a component and rather than sending back an authorization, the supervisor directly controls the components to implement the requested bypass. For example, a request to initiate operation of a dock door after failure of a trailer restraint to engage can be responded to by the supervisor sending a command that automatically opens the dock door in response to the request, rather than authorizing the user at the docking station to enter this command.

In some embodiments, the GUI also permits a user to manage and interact with several docking stations at once. For example, multiple authorization requests to deviate from a workflow protocol from separate docking stations may be received at a single remote monitoring and authorization unit, and via the GUI, the user at the remote monitoring and authorization unit may manage each of these requests from different docking stations. Similarly, commands for operating components can be sent to multiple docking station control units from a single remote monitoring and authorization control unit. The GUI provides an interface for either monitoring several docking stations at once, or toggling between different docking stations being monitored.

FIGS. 4-12, are a series of flow diagrams illustrating exemplary ways in which the remote monitoring and authorization control unit 180 can be implemented in the system 100 to provide a level of remote supervision over workflow protocol that can improve safety and efficiency of dock operations. Each of the flow diagrams generally includes a step in which an override request is made due to an unsuccessful operation of a component at the docking station. The override request typically originates from the docking station control unit 170 and is sent to the remote monitoring and authorization control unit 180, where it can be responded to by a supervisor or other individual monitoring requests that come into the remote monitoring and authorization control unit 180. While many of the flow diagrams are specific to an override request made due to an unsuccessfully engaged trailer restraint, it should be appreciated that the flow diagrams are equally applicable to any other unsuccessful or otherwise undesirable operation of other components of the system 100.

Each of the flow diagrams of FIGS. 4-12 can rely on a network, such as network 190 shown in FIG. 1C, where communication is required between different components of the system. Thus, when a flow diagram indicates, for example, the transmission of an authorization request or transmission of an authorization decision, such transmission is facilitated amongst the components of the system 100 via the network. In some embodiments, the network facilitating the operations depicted in the flow diagrams is a wireless network, such as an IoT network.

Figure 4:
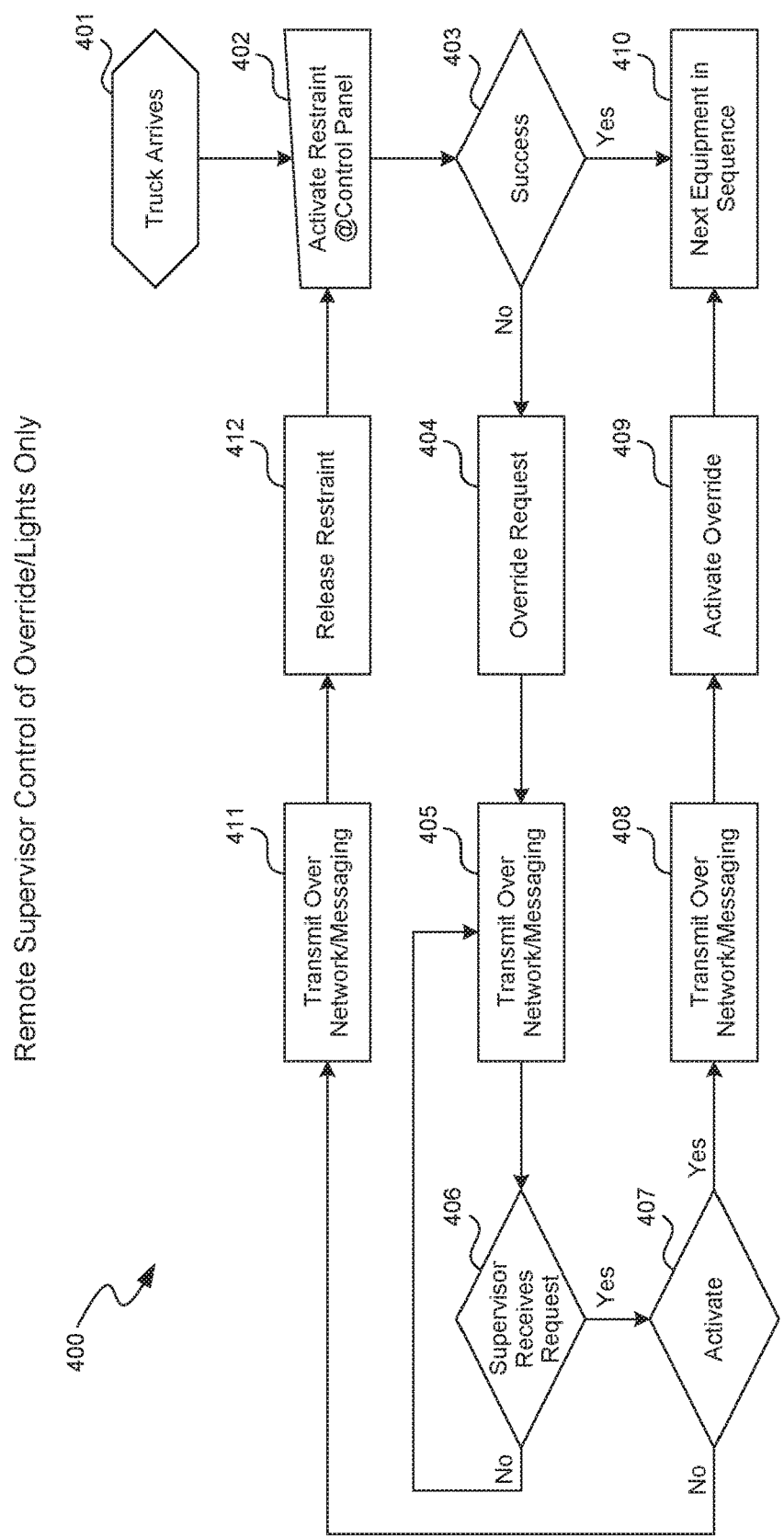
FIGS. 4-12 are flow charts illustrating various routines for operating dock equipment control systems configured in accordance with embodiments of the present technology.

FIG. 4 is a flow diagram illustrating a routine 400 for initiating an override request, authorizing or declining the override request, and in the scenario where the override request is approved, generating and sending a command to activate an override directly to the system (as opposed to giving the user at the docking station permission to provide the override command to the system at the docking station control unit). In block 401, a truck arrives at the docking station, followed by block 402 in which an operator activates the trailer restraint is activated at the control unit 170 to attempt to engage the truck. In block 402, the instruction to activate the trailer restraint is provided manually at the docking station control unit, but it should be appreciated that the activation of the trailer restraint may also occur automatically by virtue of, for example, a vehicle sensor system identifying the trailer at the docking station and initiating an automated docking station procedure that includes automatically activating the trailer restraint when a vehicle is detected at the docking station.

At decision block 403, two possible outcomes are provided: either the trailer restraint successfully engages the trailer, in which case the flow routine proceeds to block 410 (activate next component in the workflow protocol sequence), or the trailer restraint does not successfully engage the trailer. In the case of unsuccessful engagement, the flow routine moves to block 404 and generates an override request. The override request is typically generated by the docking station control unit, which is monitoring the components of the system and receives the signal from the trailer restraint system indicating unsuccessful engagement. At block 405, the override request is transmitted over a network to the remote monitoring and authorization control unit. Any type of network may be used to transmit the override request, including wired networks, wireless networks, and an IOT network. At decision block 406, the override request is received at the remote monitoring and authorization control unit for action by the dock supervisor. If for some reason, the request does not arrive at the remote monitoring and authorization control unit, block 405 can be repeated to make another attempt to send the authorization request to the supervisor. When the request is successfully received at the remote monitoring and authorization control unit, the supervisor then makes a decision to either authorize or decline the override request at decision block 407. In the scenario where the request is approved, the flow routine proceeds to block 408 where the override activation signal is sent to the control unit over the network. At block 409, the control unit receives the override activation signal and response by enabling the override function (i.e., there is no requirement that a user at the docking station take any further action in order to carry out the override function). At block 410, the next component of the docking station in the workflow protocol is activated since the override function allows for it to proceed despite the previous component not successfully completing its operation.

Referring back to decision block 407, if the supervisor elects to decline the override request, then the flow routine proceeds to block 411, where the decline message is transmitted over the network to the docking station control unit. As shown in FIG. 4, the specific instruction given with the decline message is to release the restraint (block 412) so that another attempt to engage the restraint can be carried out at block 402.

Figure 5:
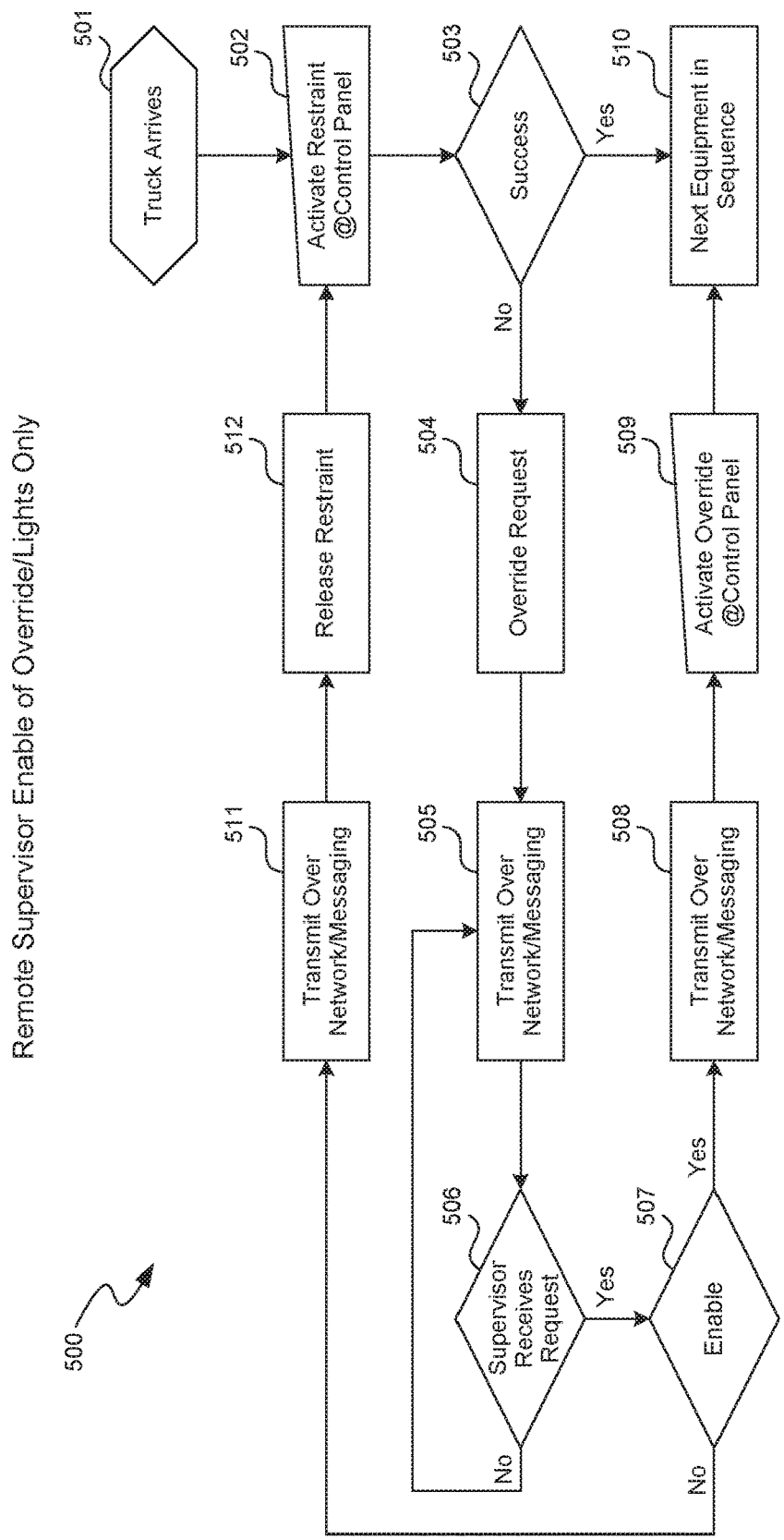

FIG. 5, is a flow diagram of a routine 500 that is similar to that illustrated in FIG. 4, except that the authorization for an override requests results in the user at the docking station being given the ability to perform the override function via the docking station control unit 170. At block 501 the truck arrives at the docking station, followed by a user at the docking station control unit 170 activating the trailer restraint at block 502. If the activation of the trailer restraint is successful at decision block 503, then the routine 500 proceeds to block 510 where the next component in the work flow protocol can be activated. If the trailer restraint is not successfully engaged, at block 503, then the flow diagram proceeds to block 504 where an override request is made. The override request is transmitted over the network at block 505 to the remote monitoring and authorization control unit 180 at decision block 506. If the request is not received at the remote monitoring and authorization control unit 180, then block 505 can be performed again to make another attempt to send the request over the network.

When the request is received at block 506, the supervisor then has the option to approve or decline the request via control unit 180. In FIG. 5, the supervisor's specific decision is whether to enable (at decision block 507) the dock personnel to perform the actual override at the docking station control unit 170. As such, when the supervisor agrees to enable the override, this message is transmitted over the network at block 508 and arrives at the docking station control panel 170. At block 509, the override command is input by the dock personnel at the docking station control panel 170, and the flow routine proceeds to block 510 for the initiation of the next component of the system in the workflow protocol. If the supervisor decides to not enable the override function at decision block 507, this message is sent via block 511 to the docking station control unit 170 to release the restraint at block 512. Once the restraint is released at 512, another attempt to activate the restraint at the docking station control panel is initiated at block 502 and the routine 500 repeats.

Figure 6:
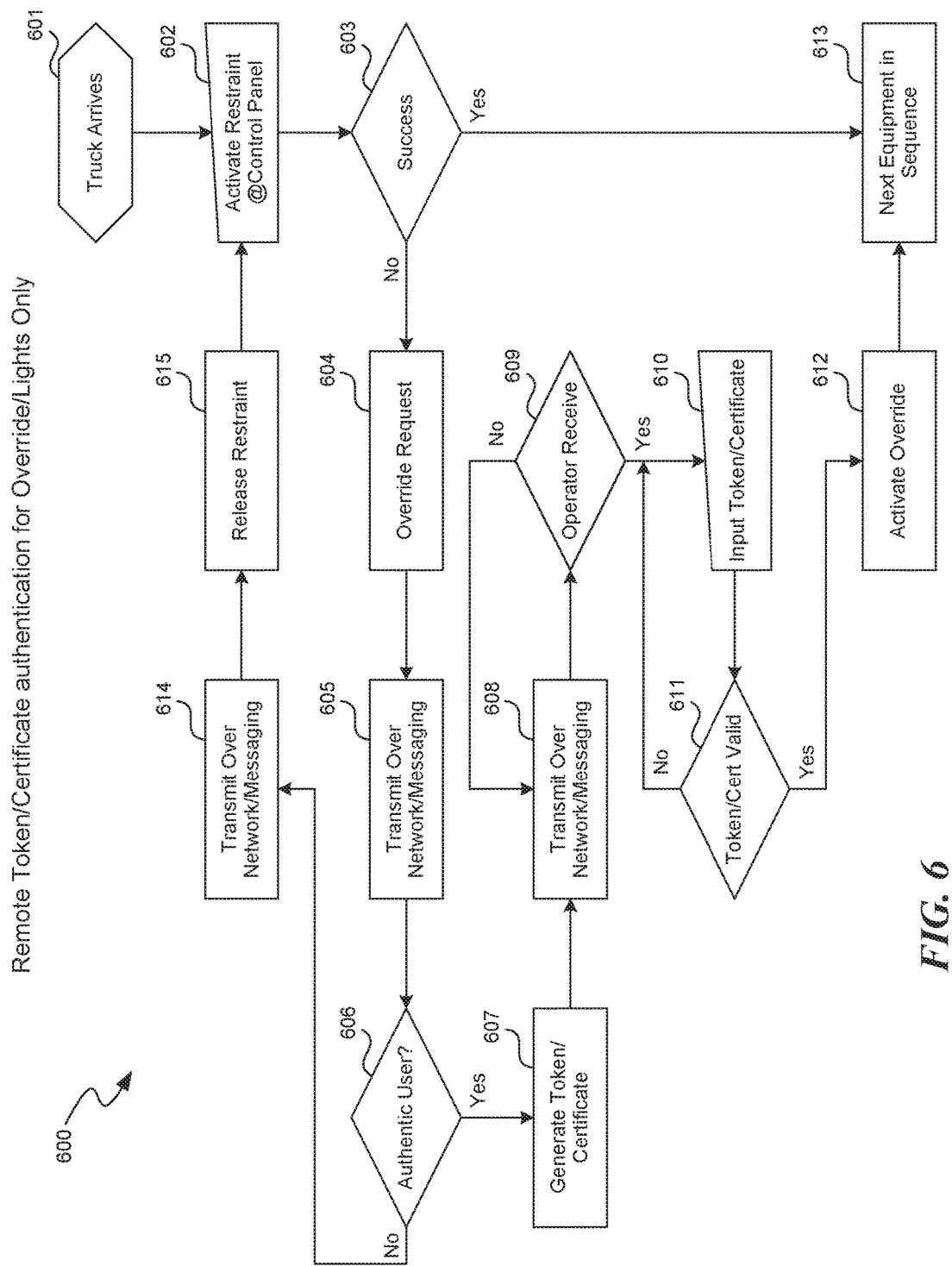

FIG. 6 is a flow diagram of a routine 600 in which a user authentication is used to authorize an override request rather than requiring a supervisor to make a decision on the override request. At block 601, a trailer arrives at the docking station, and at block 602, a command is entered at the docking station control unit 170 by, e.g., dock personnel, to activate the vehicle restraint. If the vehicle restraint engages successfully at decision block 603, the routine proceeds to block 613 where the next component in the workflow protocol is activated. If the vehicle restraint does not successfully engage at decision block 603, then an override request is generated at block 604 and transmitted over a network at block 605 so that the override request can be processed at, for example, the remote monitoring and authorization control unit 180.

However, rather than a supervisor or other user making a decision on the override request, the routine 600 utilizes a user authentication system at decision block 606 to approve or decline the request. In other words, the request is approved provided the user making the request is validated. The user authentication system can be an automated system in which the identity of the user (e.g., dock personnel) is automatically confirmed prior to providing authorization for the override request. Any manner of authenticating the user can be used, such as by having the user input a password, employee ID, unique code, fingerprint scan, etc., via the control unit 180. The authentication system checks the input information to confirm the user is an authorized user at decision block 606. If user authentication is confirmed at decision block 606, then the flow chart proceeds to block 607 where the system generates a token or certificate indicating user identification has been confirmed. At block 608 the token or certificate is transmitted over the network to the control unit 170 for receipt by the personnel at the docking station making the override request. If the token or certificate is received by the personnel at the docking station at block 609, then the personnel inputs the token or certificate at block 610, such as via the GUI of the control unit 170. If the token or certificate is not received by the user at block 609, another attempt is made to transmit the token or certificate to the dock personnel via the control unit 170. At block 610, the token or certificate received by the control unit 170 is then validated at block 611. Validation can be carried out by the control unit 170. If the token or certificate is found to be valid by the control unit 170 at block 611, then the override is activated at block 612 and operation of the next piece of equipment in the workflow protocol is activated by the control unit 170. If the token or certificate is found to be invalid or validity cannot be confirmed at block 611, then an attempt is made to reenter the token or certificate into the control unit 170 at block 609.

Referring back to decision block 606, if the user is unable to provide the required authentication information, then this information is transmitted over the network to the control unit 170 at block 614 and the trailer restraint is released at 615 via instructions from the control unit 170 so that a new attempt at activating the trailer restraint at the docking station control unit 170 can be performed at block 602.

Figure 7:
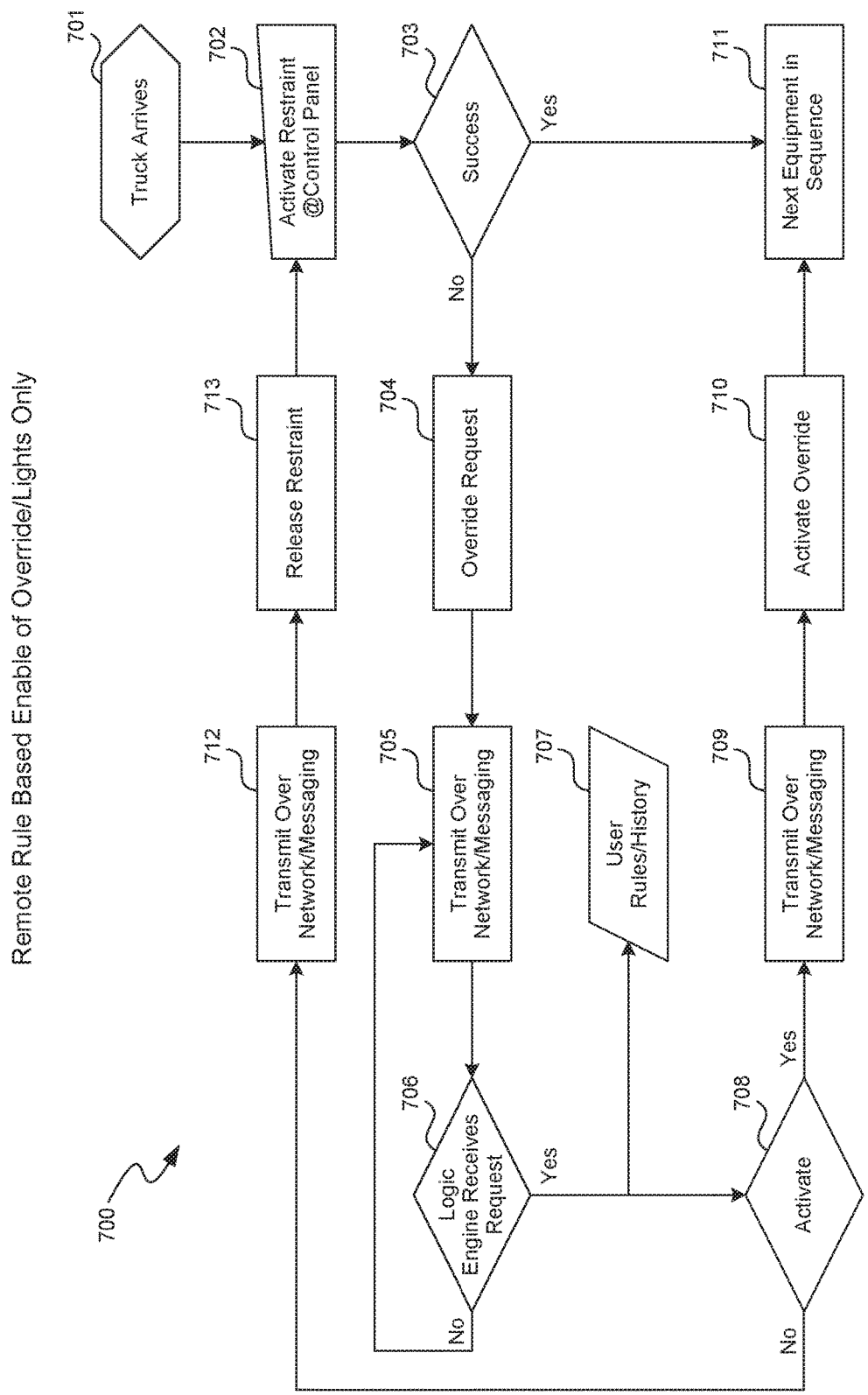

FIG. 7 is a diagram of routine 700 in which a logic engine using a combination of user data and an algorithm to process the data is used to automate the override decision making process. In FIG. 7, a trailer arrives at the docking station at block 701 to initiate the process, and a command to activate the trailer restraint is entered at the docking station control panel 170 at block 702. If the trailer restraint successfully engages at decision block 703, then the next component in the workflow protocol is initiated at block 711. If the trailer restraint does not successfully engage at decision block 703, then an override request is generated at block 704 and transmitted over the network at block 705 to a logic engine (e.g., a logic engine that is part of the remote monitoring and authorization control unit 180). The override request can include, e.g., information about the requestor, such as the requestor's identity, experience, work history, etc.

If the override request is not successfully received by the control unit 180 at decision block 706, then another attempt can be made to transmit the request over the network at block 705 to the control unit 180. When the override request is successfully received at control unit 180 at decision block 706, a database having user rules and/or history is accessed at block 707 so that the logic engine can process the data and automatically make a decision on whether or not to authorize the override request. Any set of rules and/or history can be used to make the override request decision. The rules can be relatively simple, such as accessing the requestor's years of experience and authorizing the user's request if their years of experience exceeds a predetermined minimum number of years of experience, or the rule can be more complicated, such as a weighted formula taking into consideration years of experience, previous safety record, and number of previous override requests made. Any of the data required to make the override decision is provided at block 707 and processed by the logic engine at decision block 706. At decision block 708, an activation command is generated if the logic engine at decision block 706 determines that the conditions for override request authorization have been met based on the user data from block 707. The activation signal is transmitted via the network at block 709 and is received at the docking station control panel 170 at block 710 to automatically provide the override (i.e., no further user command is required at the docking station control panel 170). Once the override activation is carried out at block 710, the next component of the system in the workflow protocol is initiated.

If the outcome at decision block 708 is that an override authorization should not be provided, then this message can be transmitted to the control unit 170 over the network at block 712 so that the trailer restraint is released at block 713, and another attempt at activating the trailer release via the docking station control panel 170 can be made at block 702.

Figure 8:
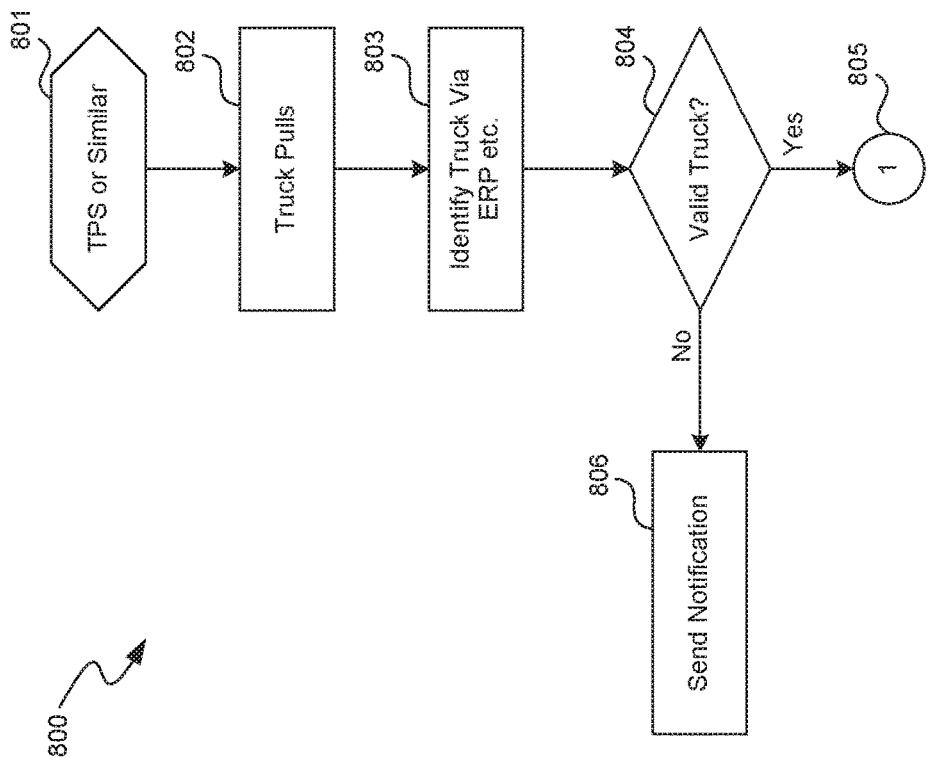
Figure 9:
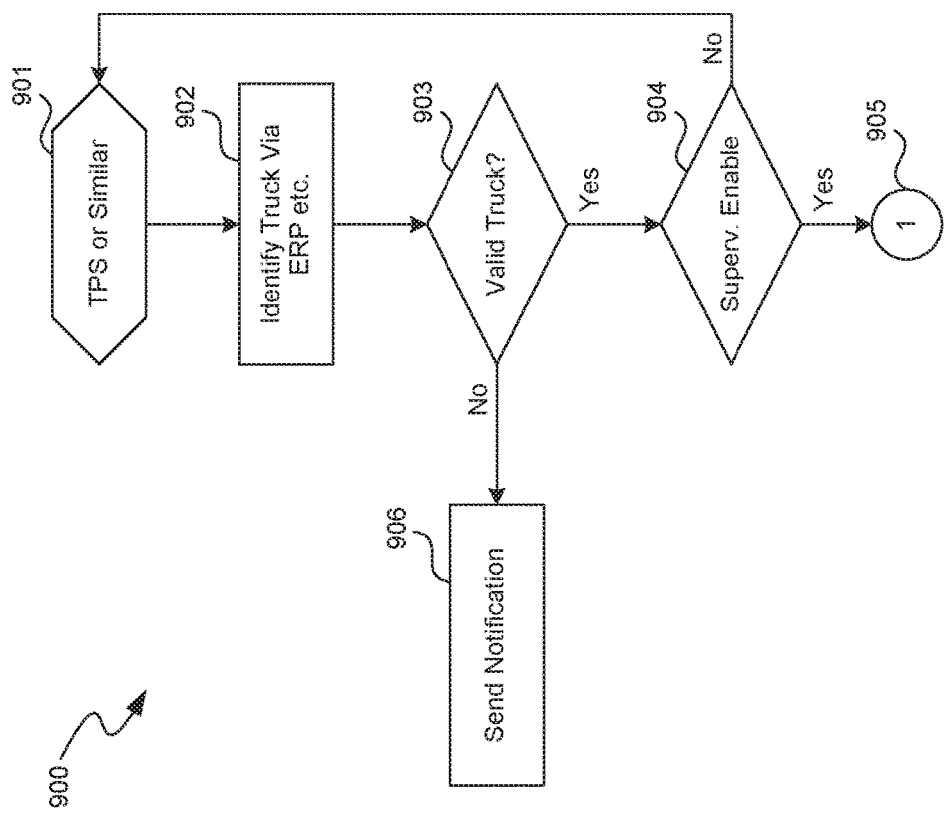

FIGS. 8 and 9 are flow diagrams of routines 800 and 900, respectively, illustrating how the remote monitoring and authorization control unit 180 can be used to detect and validate a vehicle approaching a docking station and initiate an automated docking procedure upon proper identification and validation. In FIG. 8, sensors (e.g., truck presence sensors) positioned on the drive in front of the docking station can be used at block 801 to detect an approaching vehicle at a docking station and wake the portion of the system used to identify and validate the vehicle. At block 802, the trailer arrives at the docking station, followed by a vehicle identification step at block 803. Any means of identifying the vehicle, including, for example, identification via the use of enterprise resource planning (ERP) software in conjunction with cameras, scanners, etc., can be used. Once the vehicle has been identified, validation of the vehicle is carried out at decision block 804. Validation at decision block 804 can be relatively simple, such as merely checking that the vehicle is one of the vehicles that is part of the fleet servicing the facility, or more complex, such as checking both that the vehicle is part of the fleet servicing the facility and that the vehicle is at the correct docking station per a loading/unloading schedule. If the vehicle is not validated at block decision 804, then a message or notice can be generated and sent to, e.g., the control unit 180, regarding the invalid vehicle at block 806. The type of message or notice generated is generally not limited, and may include, e.g., a text message, and email, or a voice mail sent to a dock manager via, e.g., control unit 180 (which may be, e.g., a laptop, a tablet, a smart phone, etc.). The content of the message or notice is also generally not limited, and may vary based on the recipient. For example, if the intended recipient is the driver of the vehicle, the message may include information about which dock to move the vehicle to. If the intended recipient is a supervisor or manager, then the information might relate to an alert about the presence of an unauthorized vehicle, which the supervisor or manager may then use to alert security, and ERP manager, etc.

If the vehicle is validated, then the process may proceed to block 805 and initiate any appropriate automated workflow protocol. For example, in FIG. 11, block 1101 is the same as block 805 and illustrates how arriving at block 805 can subsequently lead to initiation of an automated process for engaging a vehicle restraint and the associated authorization protocol incorporated into the automated system as described below in relation to FIG. 11.

FIG. 9 is similar to FIG. 8, but incorporates a supervisor authorization step. At block 901, sensors (e.g., truck presence sensors) are used to identify an approaching vehicle at a docking station and wake the system used to identify and validate the vehicle. At block 902, vehicle identification is carried out. Any means of identifying the vehicle, including, for example, via the use of ERP software in conjunction with cameras, scanners, etc., can be used. Once the vehicle has been identified, validation of the vehicle is carried out at decision block 903. Validation at 903 can be relatively simple, such as merely checking that the vehicle is one of the vehicles that is part of the fleet servicing the facility, or more complex, such as checking both that the vehicle is part of the fleet servicing the facility and that the vehicle is at the correct docking station per a loading/unloading schedule. If the vehicle is not validated at decision block 903, then a message or notice can be generated and sent regarding the invalid vehicle at block 906, such as sending a message to the control unit 180. If the vehicle is validated, then the process may proceed to block 904, which requires a supervisor to manually enable the subsequent automated loading dock process, such as via instructions entered using the GUI of the control panel 180. If the supervisor approves the validated vehicle, then the routine may proceed to block 905, which represents the initiation of any appropriate automated workflow protocol. If the supervisor rejects the validated vehicle at block 905, the unvalidated vehicle leaves the docking station and the process may revert back to the initial sensor step at block 901 for the arrival of another vehicle.

Figure 10:
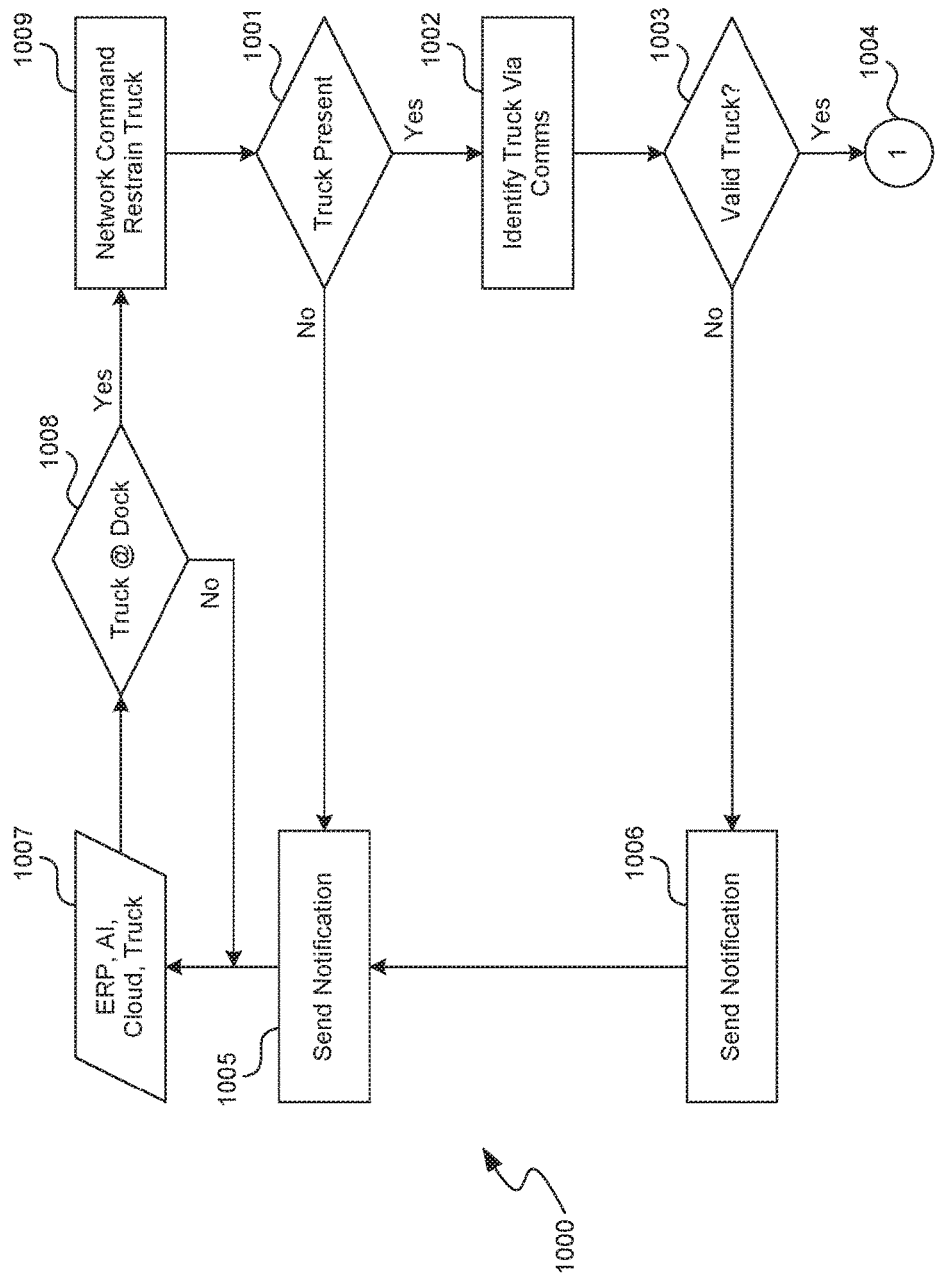

FIG. 10 is a flow diagram of a routine 1000 that is similar to the routine 700 of FIG. 7, but begins at block 1001 denoting the end of a truck identification sequence such as those described above with reference to FIGS. 8 and 9, and further does not require the activation of a trailer restraint at the docking station control panel. Rather, the trailer restraint is enabled or engages automatically at block 1002 upon completion of the truck identification process. If the trailer restraint successfully engages at decision block 1003, then the next component in the workflow protocol is initiated at block 1011. If the trailer restraint does not successfully engage at decision block 1003, then an override request is generated at block 1004 and transmitted over the network at block 1005 to a logic engine (e.g., a logic engine that is part of the remote monitoring and authorization control unit 180).

If the override request is not successfully received at decision block 1006, then another attempt can be made to transmit the request over the network at block 1005 to the control unit 180. When an override request is successfully received at block 1006, a database having user rules and/or history is accessed at 1007 so that the logic engine can process the data and automatically make a decision on whether or not to authorize the override request. Any of the data required to make the override decision is provided at block 1007 and processed by the logic engine at block 1006 (such as a logic engine run on control unit 180). At block 1008, an activation command is generated if the logic engine at decision block 1006 determines that the conditions for the override request authorization have been met. The activation signal is transmitted via the network at block 1009 and is received at the docking station control panel 170 at block

1010 to automatically provide the override (i.e., no further user command is required at the docking station control panel 170). Once the override activation is carried out at block 1010, the next component of the system in the workflow protocol is initiated.

If the outcome of the logic engine processing the user data at decision block 1000 is that an override authorization should not be provided, then this message can be transmitted over the network at block 1012 so that the trailer restraint is released at block 1013 and another attempt at activating the trailer release via the docking station control panel can be made at block 1002.

Figure 11:
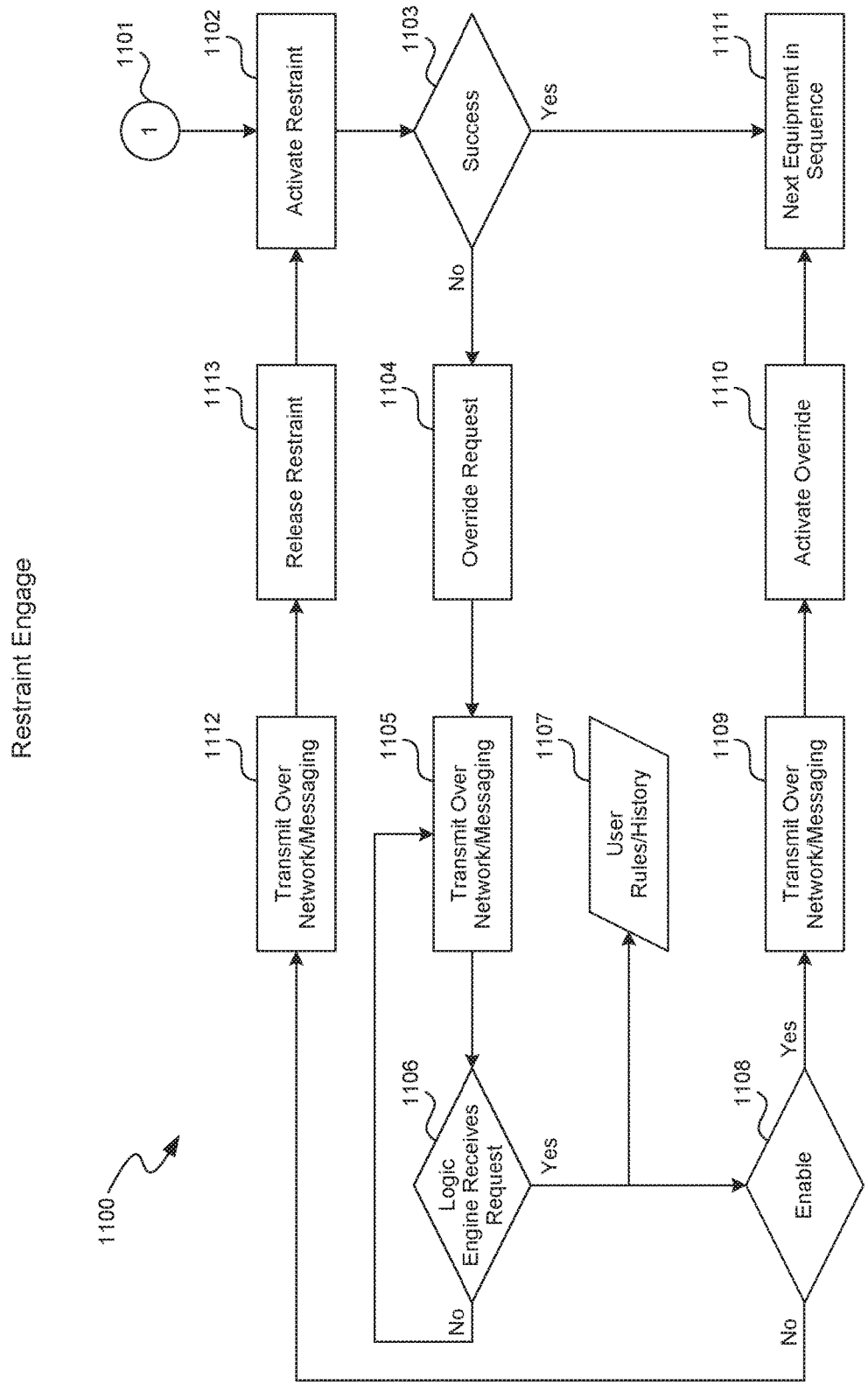

FIG. 11 is a flow diagram of a routine 1100 relating to using an automated restraint release system in conjunction with monitoring and directing vehicle traffic flow to and from the docking station. The routine 1100 starts at decision block 1107, where a check is performed to determine if loading or unloading of a vehicle at the docking station has been completed. If loading or unloading is not complete, this information is sent to the controller 180 at block 1105, which has access to a logic and data to process this information and direct general work flow at the docking station. This logic and data can be type of system capable of processing information for work flow purposes, including an ERP system or an artificial intelligence system operably connected to the control unit 180. The system may also be stored in the cloud. The information transmitted to block 1105 indicating that loading/unloading has not been completed is processed and a subsequent re-check of the loading/unloading status at block 1107 is conducted. If the loading or unloading is complete at block 1107, then the routine may proceed to block 1108, where a network command is generated and provided to the vehicle restraint system providing a vehicle restraint release command.

The routine 1100 then conducts a check to ensure a vehicle is present at the docking station at decision block 1101. If the presence of a vehicle at the docking station is confirmed, then the routine proceeds to block 1102 where the vehicle restraint is actuated to release the vehicle. Another check is also conducted at block 1103 to confirm the vehicle has been successfully released by the vehicle restraint. If the vehicle has not been successfully released, then the routine cycles back to block 1102 to perform another attempt to actuate the vehicle restraint and release the vehicle. When confirmation is provided that the vehicle has been released from the vehicle restraint at block 1103, then a message is generated at block 1104 indicating that the particular docking station is now available.

A message indicating the docking station is available is also generated at block 1104 when the check for the presence of a vehicle at block 1101 comes back confirming that no vehicle is present. Whether the message at block 1104 is generated because no vehicle is detected at decision block 1101 or because the vehicle has been successfully released at block 1102, the message is transmitted to block 1105 where the system (e.g., an ERP system, an AI system, etc.) processes this information to help direct the flow of vehicles to and from the docking station. In some embodiments, receipt of the message at block 1105 that no vehicle is present at the docking station results in the system generating and transmitting a message to another vehicle at block 1106. The message can indicate, for example, that the restraint at the docking station is not occupied or transmit to a vehicle at the dock that it is free to go. When the vehicle receives a message that the restraint is not engaged, this can be interpreted to mean that the docking station is available, in which case a recipient of the message (e.g., a driver of a vehicle waiting for a docking station to become available) can respond by moving their vehicle to the open docking station.

Figure 12:
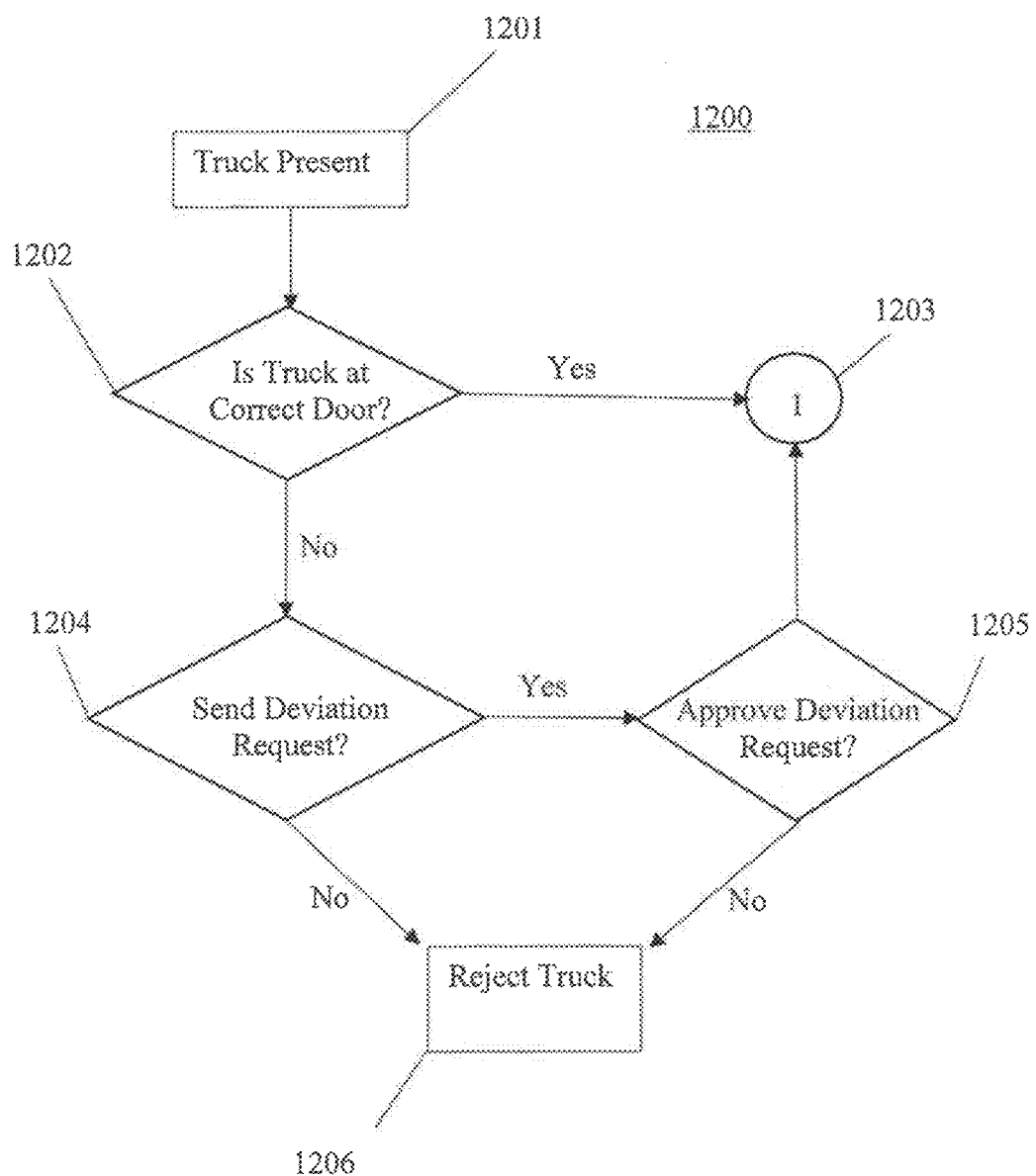

FIG. 12 is a flow diagram illustrating a routine 1200 wherein a deviation request protocol is provided for use in conjunction with systems configured to check whether a vehicle is parked at the correct dock door. In such systems, each vehicle includes an identification tag (e.g., RFID tag, bar code, etc.) and each dock door position includes a scanner, sensor, or the like capable of reading the identification tag to identify the vehicle. The system further includes a database that matches a vehicle's identification to the vehicle's load so that when a vehicle arrives at a dock door, its contents are known from identifying the vehicle, at which point a determination can be made as to whether the vehicle is positioned at the correct door (i.e., a door suitable for unloading the contents of the vehicle). Similar data can be provided in the database for identifying what material is to be loaded into a particular vehicle to ensure the vehicle is parked at the appropriate door for the loading of certain goods (i.e., a door where goods intended to be loaded into the identified vehicle are located). When a correct match is made between an identified vehicle and the door at which it is parked, the system may automatically enable some or all components of the docking station and/or initiate an automated dock loading/unloading sequence (e.g., automatically engage the trailer restraint, followed by automatically opening the dock door, etc.).

At block 1201, a truck arrives at the dock door, at which point truck identification is carried out. Truck identification can be carried out automatically upon determining a truck is at a door (such as via the use of truck detection sensors positioned at the dock door). The truck's identification tag is positioned at a location where the identification tag reader provided at the dock door can read and process the identification tag. For example, a bar code may be provided on the tailgate of a vehicle so that as it backs up to the door, a bar code scanner approximately aligned with the vehicle tailgate scans the bar code and identifies the truck. At block 1202, a determination is made as to whether the truck is valid, i.e., positioned at the correct door. This determination utilizes the previously mentioned database that provides a truck's contents based on its identification, and then assesses whether the door at which the truck is parked is suitable for unloading the identified contents. When the truck is determined to be valid (i.e., parked at a correct door based on its contents), the routine proceeds to block 1203, which represents the initiation of an appropriate automated workflow protocol.

When the truck is determined to be invalid (i.e., not parked at the correct door), operation of the loading dock components of the docking station at which the vehicle is parked may be locked out and/or an automated workflow protocol may be prohibited from initiating. The routine then proceeds to block 1204 where a decision is made on whether to send a deviation request (i.e., a request to allow loading or unloading of the truck at the door where it is parked regardless of the database indicating that the truck is parked at an incorrect door). If a decision is made to generate and transmit a deviation request, then the routine proceeds to block 1206, where the truck is rejected (i.e., not permitted to load/unload at the door at which it is parked).

If a decision is made to generate and transmit a deviation request, then the routine proceeds to block 1205, where the deviation request is approved or rejected. As discussed above, the deviation request seeks permission for the vehicle to remain at the door at which it is parked despite the vehicle carrying a load that, at least according to the database, may not be suitable for unloading at that door. The deviation request may be sent to, for example, a remote monitoring and authorization control unit where a dock manager or the like receives the request and makes a determination as to whether the vehicle can remain at the dock door and unload its contents. The dock manager may use information not included within the database to make a decision on the deviation request, such as information indicating that all other appropriate dock doors are unavailable, in which case the dock manager may elect to approve the deviation request in order to maintain efficient workflow at the warehouse and prevent vehicles from waiting to be unloaded. In the scenario where the deviation request is approved, the routine can proceed to block 1203, which represents the initiation of an appropriate automated workflow protocol. When the routine proceeds to block 1203, the previously locked out components of the dock door are enabled and/or an automated workflow protocol is automatically initiated (or allowed to be initiated).

In the scenario where the deviation request is rejected, the routine proceeds to block 1206 where the vehicle is rejected (i.e., not permitted to use the dock door at which it is parked for loading or unloading). When a vehicle is rejected, the lock out of the dock components and/or prohibition on initiating an automated workflow protocol is maintained such that the dock door essentially becomes inoperable. This prevents a worker at the dock door and/or the driver from attempting to unload the vehicle despite the determination that the vehicle is not parked at a suitable dock door based on its identified contents. In some embodiments, the rejection of the vehicle can be accompanied by re-routing information, i.e., providing the vehicle with the number/location of a dock door that has been identified as being suitable for the identified truck such that the driver can reposition the vehicle at an appropriate door for loading/unloading.

While the discussion of the above remote monitoring and authorization control unit 180 has focused primarily on the authorization functionality of the control unit, it should be appreciated that monitoring functions can also be provided. For example, information relayed to the remote monitoring and authorization control unit 180 via the docking station control unit 170 is readily accessible to a supervisor or other user via, e.g., a display screen provided on the control unit 180, including information on any component of any docking station that is part of the overall system. The immediate availability of this type of information can advantageously provide a supervisor with the ability to better manage the facility as a whole and increase operation efficiency. For example, status data relating to all components of all docking stations can allow a supervisor to ascertain what docking station is most likely to be next available and communicate with incoming vehicles to maneuver to these stations in order to minimize docking station down time and vehicle wait time.

The data provided to the remote monitoring and authorization control unit can also be recorded and processed to increase operation efficiency. For example, statistics can be generated on the efficiency or lack thereof of each docking station, which can in turn be used for training and facility optimization purposes. Similarly, statistics on accidents occurring at docking stations can also be used to identify and correct safety hazards, and train personnel committing multiple safety infractions.

In addition to monitoring dock operations and equipment, and receiving and responding to authorization requests, the remote monitoring and authorization control unit 180 can also be configured to either directly control operation of one or more components at the docking station or communicate through the docking station control panel 170 to control operation of one or more components at the docking station. In this manner, a supervisor or other remote user at the remote monitoring and authorizing control unit can take partial or complete control over the docking station under a variety of different circumstances and for any of a variety of different reasons.

Taking control of one or more components of the docking station via the remote monitoring and authorization control panel can also include locking out one or more components of the docking station. Such action may be necessary when, for example, an accident has occurred at a docking station, or when remote monitoring of the docking station via the remote monitoring and authorization control unit reveals that dangerous or unsafe actions are being carried out by users at the docking station and intervention to prevent an accident is required.

Control over docking stations via the remote monitoring and authorization control panel can also be used to improve workflow, such as by enabling operations at an otherwise dormant and unmanned docking station. For example, if a facility is operating ten of its twelve docking stations and each docking station is occupied with a vehicle, the arrival of a new vehicle can be attended to remotely by a supervisor at the remote monitoring and authorization control unit, who may remotely initiate some or all of an automated docking and loading/unloading protocol for a vehicle at one of the two unused docking stations. As such, it may not be necessary for workers to be present at a given docking station for the docking station to be brought into use when the user at the remote monitoring and authorization control panel is capable of operating an unmanned docking station remotely.

The ability to remotely activate components of the docking station via the remote monitoring and authorization control unit can also be used for other reasons, such as to allow a door at an unused docking station to be opened (or directly open the door remotely) in order to improve air flow within the facility. Such an authorization or command can be accompanied by restrictions on the operation of other components so that the opening of the dock door does not inadvertently lead to someone trying to load or unload a vehicle at the particular docking station.

As noted above, remote operation of an entire docking station is possible via the remote monitoring and authorization control unit, which includes all manner of remove devices (e.g., smart phones, tablets, laptop computers, etc.), and such remote control over a docking station can be well suited for facilities employing automated loading environments (i.e., where use of human personnel is limited and most or all procedures are carried out using automated systems). In such systems, a vehicle being present at a docking station might initiate an alert to the remote monitoring and authorization control panel, where a supervisor can provide authorization to begin the automated loading/unloading process. The automated process then begins and flows through the workflow protocol in an automated manner, all while the supervisor at the remote monitoring and authorization control unit may monitor the operations. In one example, remote authorization by the supervisor results in automated engagement of the vehicle restraint to restrain the vehicle at the docking station, automated opening of the door upon successful engagement of the vehicle restraint, automated activation of the dock leveler upon successful opening of the dock door, and initiation of an automated loading and unloading system (e.g., a system including robots, laser guided vehicles, etc.) to service the vehicle.

From the foregoing, it will be appreciated that specific embodiments of the invention have been described herein for purposes of illustration, but that various modifications may be made without deviating from the scope of the invention.

What is claimed is:

1. A system for use with a loading dock station, comprising:
   a docking station control unit; and
   a remote control unit communicatively coupled to the docking station control unit, the remote control unit being programmed with computer readable instructions that, when executed, cause the remote control unit to:
   receive an authorization request from the docking station control unit, the authorization request requesting authorization to deviate from a workflow protocol;
   display the authorization request to a user;
   receive an authorization input from the user; and
   transmit an authorization signal to the docking station control unit in response to receiving the authorization input from the user, the authorization signal permitting the docking station control unit to proceed with the requested deviation from the workflow protocol.

2. The system of claim 1, wherein the work flow protocol is implemented by the docking station control unit at the loading dock station.

3. The system of claim 1, wherein the docking station control unit automatically generates and transmits the authorization request when the docking station control unit receives a message from a first component of the loading dock station indicating that the first component has not successfully completed an operation at the loading dock station.

4. The system of claim 1, wherein the docking station control unit generates and transmits the authorization request in response to an input from a user at the loading dock station.

5. The system of claim 1, wherein the authorization input is received from a user at the monitoring and authorization control unit.

6. The system of claim 1, wherein:
   the authorization input is generated by a logic engine; and
   the logic engine generates the authorization input by accessing a database and processing data from the database according to an authorization algorithm.

7. The system of claim 1, wherein deviation from the workflow protocol by the docking station control unit is prohibited without first receiving authorization from the remote control unit.

8. The system of claim 1, wherein:
   the workflow protocol requires successful operation of a first component at the loading dock station before an operation of a second component at the loading dock station is allowed to begin; and
   deviation from the workflow protocol comprises operating the second component of the loading dock station without successful operation of the first component.

9. The system of claim 7, wherein:
   the first component is a vehicle restraint system;
   successful operation of the vehicle restraint system comprises successfully engaging a vehicle with the vehicle restraint system;
   the second component is a dock door opening system; and
   operation of the dock door opening system comprises opening the dock door.

10. The system of claim 1, wherein the remote control unit is further communicatively coupled with at least a first component and a second component of the loading dock station.

11. The system of claim 10, wherein upon receipt of the authorization input, the remote control unit directly instructs the second component of the loading dock station to perform an operation and thereby deviate from the workflow protocol without transmitting the authorization signal to the docking station control unit.

12. The system of claim 1, wherein the monitoring and authorization control unit is located remote from the loading dock station.

13. A computer-implemented method for controlling operation of a loading dock station, the method comprising:
   automatically transmitting an authorization request to a remote control unit when a request to deviate from a loading dock station workflow protocol is made at a loading dock station control unit;
   generating an authorize or decline signal at the remote control unit in response to receipt of the authorization request; and
   transmitting the authorize or decline signal from the remote control unit to the loading dock station control unit, wherein the loading dock station is prohibited from performing an operation that deviates from the workflow protocol while the authorization request is outstanding, wherein receipt of an authorize signal at the loading dock station control unit permits the loading dock station control unit to perform the requested deviation from the workflow protocol, and wherein receipt of a decline signal at the loading dock station control unit prohibits the loading dock station control unit from performing the requested deviation from the workflow protocol.

14. The method of claim 13, wherein the authorize or decline signal is generated by a loading dock station facility supervisor entering an authorize or decline decision into the remote control unit.

15. The method of claim 14, wherein the supervisor's authorize or decline decision is made at least in part by considering data pertaining to the status of one or more components of the loading dock station that is displayed at the remote control unit.

16. The method of claim 13, wherein transmitting the authorize signal leads to direct performance of an operation of a component of the loading dock station upon receipt of the authorize signal at the loading dock station control unit.

17. The method of claim 13, wherein transmitting the authorize signal authorizes the loading dock station control unit to perform an action that deviates from the workflow protocol but requires that further action be taken at the loading dock station control unit before the operation deviating from the workflow protocol is performed.

18. The method of claim 13 wherein generating an authorize or decline signal at the remote control unit upon receipt of the authorization request is based on conducting a user authentication step.

19. The method of if claim 18, wherein user information is transmitted with the authorization request and the user information is used to determine whether to generate an authorize or decline signal.

20. The method of claim 19, wherein the user information comprises a password, a user identification number, or a fingerprint scan.

21. The method of claim 13, wherein the authorization request and the authorize or decline signal are transmitted via a wireless network.

22. The method of claim 21, wherein the wireless network is an Internet of Things wireless network.

* * * * *